(12) United States Patent
Liu et al.

(10) Patent No.: US 12,139,019 B2
(45) Date of Patent: Nov. 12, 2024

(54) ELECTRIC WHEEL END DRIVELINE SYSTEMS AND METHODS

(71) Applicant: Dana Limited, Maumee, OH (US)

(72) Inventors: Yang Liu, Wuxi (CN); Pradip Jasud, Pune (IN); Sushil Patil, Pune (IN); Shailesh Dalvi, Pune (IN)

(73) Assignee: DANA LIMITED, Maumee, OH (US)

( * ) Notice: Subject to any disclaimer, the term of this patent is extended or adjusted under 35 U.S.C. 154(b) by 124 days.

(21) Appl. No.: 17/807,664

(22) Filed: Jun. 17, 2022

(65) Prior Publication Data
US 2023/0406090 A1    Dec. 21, 2023

(51) Int. Cl.
*B60K 7/00*     (2006.01)
*B60K 17/04*    (2006.01)

(52) U.S. Cl.
CPC .......... *B60K 7/0007* (2013.01); *B60K 17/046* (2013.01); *B60K 2007/0092* (2013.01); *B60Y 2200/20* (2013.01)

(58) Field of Classification Search
CPC ....................... B60K 7/0007; B60K 2007/0092
See application file for complete search history.

(56) References Cited

U.S. PATENT DOCUMENTS

| | | | |
|---|---|---|---|
| 10,953,745 B2 | 3/2021 | Jasud et al. | |
| 11,346,439 B1* | 5/2022 | Langenfeld | F16H 57/082 |
| 2014/0330471 A1* | 11/2014 | Ozaki | B60L 15/007 |
| | | | 701/22 |
| 2015/0112531 A1* | 4/2015 | Nakajima | B60K 7/0007 |
| | | | 701/22 |
| 2018/0015823 A1* | 1/2018 | Wu | B60K 7/0007 |
| 2021/0001718 A1* | 1/2021 | Beiler | B60K 17/354 |
| 2021/0001937 A1* | 1/2021 | Beiler | B60G 11/225 |
| 2021/0001938 A1* | 1/2021 | Beiler | B60P 1/44 |
| 2023/0053415 A1* | 2/2023 | Van Iersel | H02K 7/088 |
| 2023/0219389 A1* | 7/2023 | Lee | B60G 3/26 |
| | | | 280/124.128 |
| 2023/0234438 A1* | 7/2023 | Lee | B60G 3/20 |
| | | | 180/6.48 |
| 2023/0392656 A1* | 12/2023 | Johansson | B60T 1/005 |
| 2023/0398856 A1* | 12/2023 | Jansen | B60K 7/0007 |
| 2023/0406090 A1* | 12/2023 | Liu | B60K 1/00 |
| 2024/0083240 A1* | 3/2024 | Lambert | F16D 59/02 |

FOREIGN PATENT DOCUMENTS

| | | |
|---|---|---|
| CN | 110341500 A | 10/2019 |
| WO | 2010012151 A1 | 2/2010 |

* cited by examiner

*Primary Examiner* — Erez Gurari
(74) *Attorney, Agent, or Firm* — McCoy Russell LLP

(57) ABSTRACT

A method for operating an off-highway vehicle, comprising: receiving a torque request; rotating a first wheel at a first speed via a first side motor based on the torque request, wherein the first side motor is positioned coaxially with respect to the first wheel; and rotating a second wheel at a second speed via a second side motor based on the torque request, wherein the second side motor is positioned coaxially with respect to the second wheel.

7 Claims, 11 Drawing Sheets

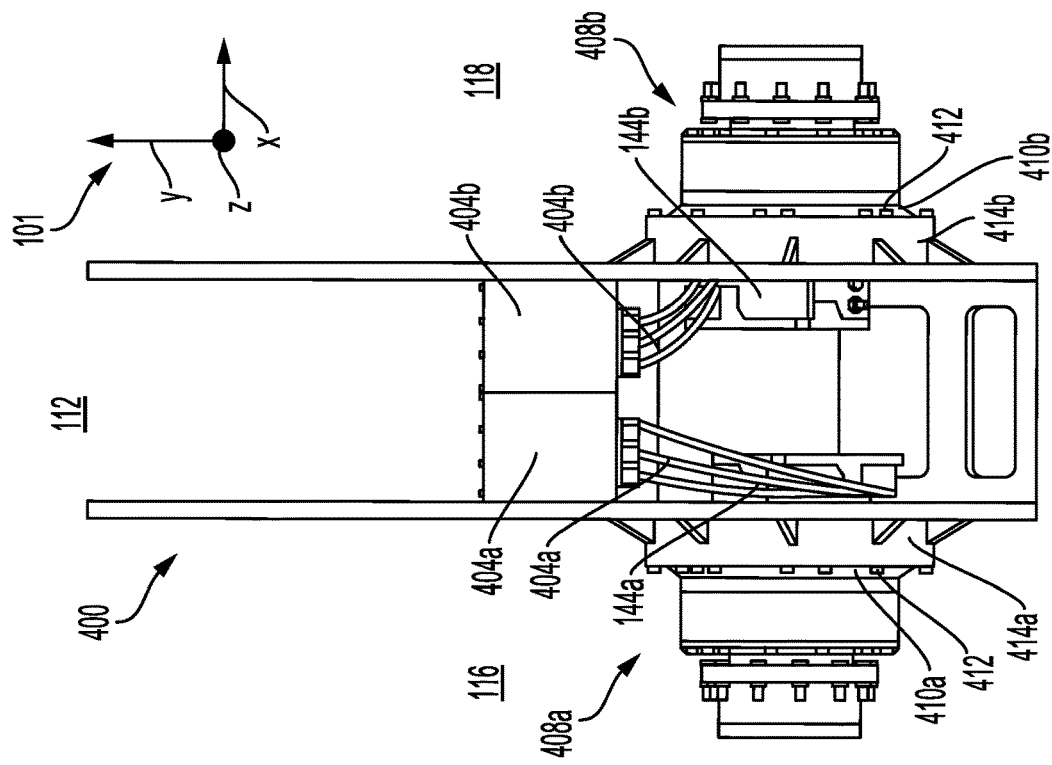
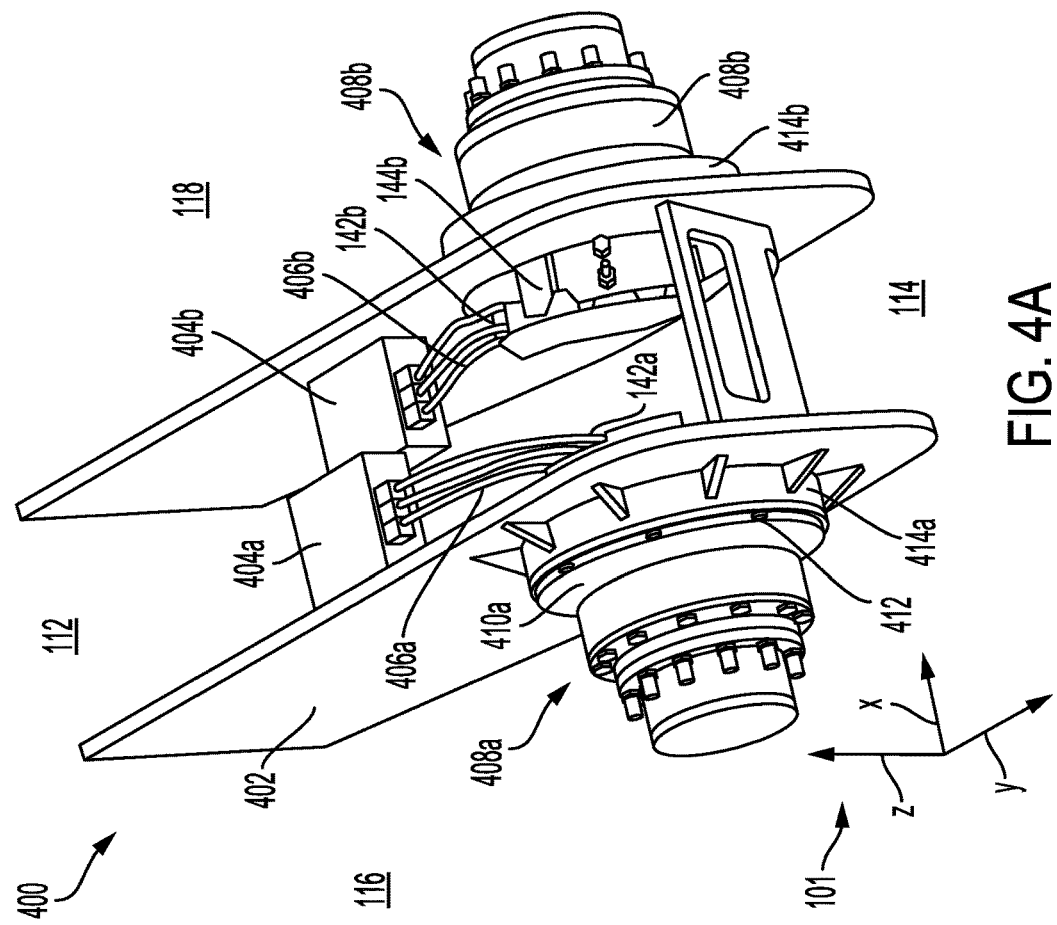

ELECTRIC WHEEL END DRIVELINE SYSTEMS AND METHODS

TECHNICAL FIELD

The present application relates generally to systems and methods for a wheel end driveline of a vehicle.

BACKGROUND AND SUMMARY

Vehicles, including off-highway work vehicles such as straddle carriers, forklifts, or tractors, have a drive train that may include a transmission, drive shaft, and a drive axle. Typically, the drive shaft stretches along a length of the vehicle from a transmission unit, which is connected to a prime mover, such as an engine or electric motor, to the drive axle of the vehicle. The drive axle connects wheels coaxially positioned on either side of the vehicle, where the drive axle is responsible for driving and steering the vehicle, and a differential assembly adjusts a speed of the wheels with respect to one another to avoid slipping while propelling the vehicle through turns.

Vehicles with such traditional driveline configurations, including those shown in the prior art examples at FIG. 1 and FIG. 2, have relatively wide drive axles and long drive shafts. Thus, dimensions of vehicles with driveline configurations as discussed above can be problematic for maneuvering the vehicle. For example, in cases where the vehicle is operated at a work site, the wide drive axle and long drive shaft may prevent the vehicle from being driven along work site tracks, which are often narrow. Moreover, the drive axle extending along the length of the vehicle leads to power losses and requires significant lubricating oil to function.

The inventors have recognized the above challenges and developed a solution to at least partially address the above issues by replacing the drive shaft and drive axle configuration discussed above with a vehicle frame and two separate wheel end drivelines.

In particular, the inventors have developed systems and methods for an off-highway vehicle without a driveshaft, where the systems and methods developed by the inventors comprise a first wheel end driveline coupled to one or more wheels at a first side of the vehicle, and a second wheel end driveline coupled to one or more wheels at a second side of the vehicle. Each of the first wheel end driveline and the second wheel end driveline comprises a motor to drive the one or more wheels on the first side and second side of the vehicle, respectively.

Via the first wheel end driveline and the second wheel end driveline developed by the inventors, both the width and the length of the vehicle is reduced compared to traditional driveline configurations resulting in an overall more compact vehicle. Thus, a maneuverability of the off-highway vehicle is improved. Furthermore, an operational efficiency of the off-highway vehicle is improved and oil lubrication requirements are reduced compared to traditional driveline configurations where a drive shaft extends along a length of the vehicle.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4A depicts an isometric view of the wheel end driveline configuration, according to one or more examples of the present disclosure.

FIG. 4B depicts an overhead view of the wheel end driveline configuration, according to one or more examples of the present disclosure.

DETAILED DESCRIPTION

Figure 1:
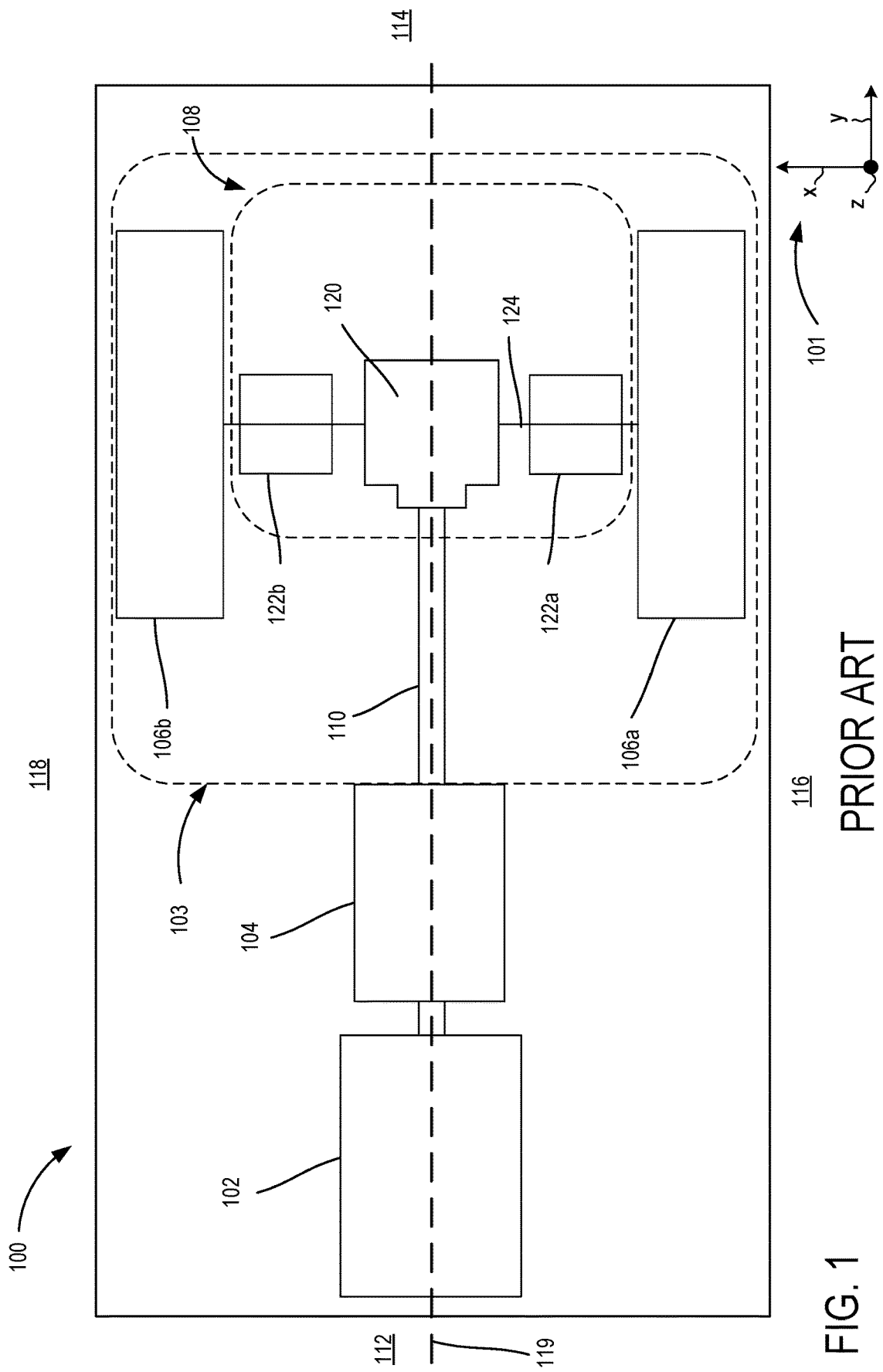
FIG. 1 depicts a block diagram of a first example vehicle according to the prior art.

The following description relates to systems and methods for an off-highway vehicle driveline configuration. The prior art, such as the examples shown at FIG. 1 and FIG. 2, include a vehicle driveline having a drive shaft that extends along a length of the vehicle from a transmission unit which is connected to a prime mover to a drive axle, where the drive axle couple wheels that are coaxially positioned relative to one another on either side of the vehicle. The off-highway vehicle of the present disclosure does not have a drive shaft as in the prior art. Instead, the off-highway vehicle of the present disclosure comprises a driveline configuration with a first wheel end driveline and a second wheel end driveline. FIG. 3 shows the first wheel end driveline may be coupled to one or more wheels at a first side of the off-highway vehicle, and the second wheel end driveline may be coupled to one or more wheels at a second side of the off-highway vehicle. The first wheel end driveline and the second wheel end driveline comprise a first side wheel end motor and a second side wheel end motor, respectively. As seen in FIG. 3, the first side wheel end motor may be positioned substantially coaxially with the one or more wheels at the first side of the off-highway vehicle, and the second side wheel end motor may be positioned substantially coaxially with the one or more wheels at the second side of the off-highway vehicle. The first side wheel end motor and the second side wheel end motor are housed in a first wheel end driveline motor assembly and second wheel end driveline motor assembly, respectively, where the first and second side wheel end driveline motor assemblies further include a dynamic brake assembly and gear assembly, as shown in detail at FIG. 5, FIG. 6, FIG. 7A, and FIG. 7B. The first wheel end driveline and the second wheel end driveline may be coupled to a substantially U-shaped frame of the vehicle, as seen in the example at FIG. 4A and FIG. 4B. It should be appreciated that the described systems reduce the need for, and may omit, a separate transmission assembly.

An off-highway vehicle comprising the driveline configuration according to the present disclosure may individually control the first side wheel end motor and the second side wheel end motor. As discussed in the example method at FIG. 8, the first side wheel end motor and the second side wheel end motor may be controlled responsive to receiving a torque input request via an operator input device (e.g., an accelerator pedal of the vehicle) and based on whether or not a turning input has been received via a turning input device (e.g., a steering wheel of the vehicle). Depending on the torque request and whether or not a turning input has been received, the first side wheel end motor and the second side wheel end motor may be operated at different speeds as discussed in FIG. 9 or at the same speed. Further, as discussed in the example method at FIG. 8, a brake request may be received by way of the vehicle being transitioned to an off state or by receiving an input at a braking input device (e.g., an input received at a brake pedal of the vehicle). Responsive to receiving a brake request, brakes of the vehicle may be applied as discussed in the example at FIG. 10.

It is to be understood that the specific assemblies and systems illustrated in the attached drawings, and described in the following specification are simply exemplary embodiments of the inventive concepts defined herein. For purposes of discussion, the drawings are described collectively. Thus, although they may not be, like elements may be commonly referred to herein with like reference numerals and may not be re-introduced. FIGS. 4A-7 are shown approximately to scale. As used herein, the term "approximately" is construed to mean plus or minus five percent of the range unless otherwise specified. As used herein, the term "substantially" is construed to mean plus or minus five percent of the range unless otherwise specified. FIG. 4A-7 may be used to represent other relative dimensions.

Further, FIGS. 4A-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

FIG. 1 shows a block diagram of a first example vehicle 100 according to the prior art. The vehicle 100 comprises internal combustion engine 102 as a prime mover and power source. The vehicle 100 also has a driveline 103 and transmission 104, wherein the driveline 103 comprise a first wheel 106*a*, a second wheel 106*b*, a drive axle 108, and a drive shaft 110. Though first wheel 106*a* and second wheel 106*b* are shown in FIG. 1, it is noted that more wheels may be included in one or more examples. For one example, the vehicle 100 may comprise four or more wheels, including two or more front wheels.

A set of reference axes 101 are provided in FIG. 1-7. The reference axes 101 indicate a y-axis, an x-axis, and a z-axis. In one example, the z-axis may be parallel with a direction of gravity and the x-y plane may be parallel with a horizontal plane the vehicle 100, electric vehicle 130, and present disclosure off-highway vehicle 140 may rest upon. The x axis may be parallel with the length of the wheel end drivelines (e.g., 408*a*, 408*b*). A plane parallel to the x-z plane may be used to create the cutouts visible in FIG. 7A, (e.g., 700). As such, a cross-sections of FIG. 7A are taken along the x-z plane. The y-axis or a line parallel with the y-axis are be normal to cutouts/cross-sections (e.g., 700 in FIG. 7A).

The vehicle 100 may have a front side 112 and a rear side 114, where the front side 112 and the rear side 114 are opposing ends of the vehicle 100. The engine 102 may be located toward the rear side 114 while the drive axle 108 may be located toward the rear side of the vehicle 100. The vehicle 100 may further comprise a first side 116 and a second side 118, where the first side 116 and the second side 118 are opposing sides of the vehicle 100. There may be a first wheel 106*a* toward the first side 116 and a second wheel 106*b* toward the second side 118 of the vehicle 100. The first side 116 and the second side 118 are between the front side 112 and the rear side 114.

The vehicle 100 may have a length and a width. The length comprises the distance of the vehicle 100 in longitudinal or y direction with respect to the y-axis for the example in FIG. 1. The length of the vehicle 100 may also comprise the distance between the front side 112 and rear side 114 or vice versa. The width comprises the distance of the vehicle 100 in the x direction with respect to the x-axis in FIG. 1. The width of the vehicle 100 may also comprise the distance between the first side 116 and second side 118 or vice versa. The first side 116 and second side 118 of vehicle 100 may be separated by a vehicle centerline 119.

The vehicle centerline 119 is parallel with the y-axis. The vehicle centerline 119 may also divide the vehicle 100 into two symmetrical halves.

The drive axle 108 may have a differential assembly 120, an axle shaft 124, and a plurality of final drives, including a first final drive 122a and a second final drive 122b. The differential assembly 120 may support and connect the axle shaft 124 to the drive shaft 110. The axle shaft 124 may support the first final drive 122a, the second final drive 122b, and a plurality of wheels, including a first wheel 106a and a second wheel 106b.

For one example, the engine 102 may use diesel as a fuel source. For another example, the engine may use gasoline as a fuel source. The engine 102 may convert the chemical energy of the fuel into mechanical energy. Engine 102 may produce emissions while converting chemical energy to mechanical energy. Emissions may include gasses such as carbon dioxide ($CO_2$), carbon monoxide (CO), and nitrogen oxide (NOx).

Mechanical energy generated by engine 102 may be transmitted to the transmission 104. The transmission 104 may transfer mechanical energy to the drive axle 108 through the drive shaft 110. The transmission 104 may also provide different speed options as per requirement of the vehicle. The setting option and gear of the transmission 104 may control the energy transferred and torque into the drive shaft 110. The mechanical energy causes the drive shaft 110 to rotate. The rotation of the drive shaft 110 transfers mechanical energy into the differential assembly 120. The differential transfers mechanical energy from the drive shaft 110 into the axle shaft 124. The mechanical energy may cause the axle shaft 124 to rotate. Depending on the rotation of the drive shaft 110 and embodiment of differential assembly 120, the axle shaft 124 may rotate in the direction of the front side 112 or the rear side 114. The rotation of the axle shaft 124 forces the wheels to rotate in a similar direction. If the vehicle 100 is turning, first side 116 and second side 118 of the axle shaft 124 as well as the first wheel 106a and second wheel 106b are rotated at different speeds. The first final drive 122a, second final drive 122b, and differential assembly 120 may change the rotational speed of the first wheel 106a, second wheel 106b, and different sides of the axle shaft 124 so the vehicle 100 may turn without slipping over a road surface and while reducing degradation to the driveline.

The first final drive 122a and second final drive 122b may reduce the speed of the axle shaft 124 by decreasing the RPM and increasing the torque. The first final drive 122a and second final drive 122b may allow for the vehicle 100 to carry and move loads with greater mass by increasing the torque on the drive shaft. Additionally, the first final drive 122a and second final drive 122b may help the vehicle 100 to turn while preventing slipping. The first final drive 122a on the first side 116 and second final drive 122b on the second side 118 may rotate at different speeds. The first final drive 122a and second final drive 122b may then rotate the first side 116 and second side 118 of the axle shaft 124 as well as the first wheel 106a and second wheel 106b at different speeds. The first final drive 122a and second final drive 122b may contain a single planetary gear assembly or of a plurality of planetary gear assemblies.

The first final drive 122a and second final drive 122b may each have a planetary gear assembly in one or more examples, also referred to herein as a planetary assembly. The planetary assemblies may comprise a ring gear, a planetary carrier, a plurality of planet gears, and a sun gear. The planetary carrier acts as a supporting member of and housing for the planet gears when the planetary assembly of the first final drive 122a and second final drive 122b are fully assembled. A sun gear may be the center of the planetary assembly and may be coupled to the axle shaft 124. When the planetary assembly is fully assembled, the teeth of the sun gear may interlock with the teeth of the planet gears. When the planetary assembly is fully assembled, the teeth of the planetary gears may interlock with the teeth of the ring gear. The rotation of the planet gears around the sun gear transfers mechanical energy from the sun gear and sun gear side of the shaft to the carrier side of the shaft.

The rotation of the planet gears around sun gear and in the ring gear may slow the speed at which the planet carrier turns. With the similar amount of energy transferred to the planet carrier, the slowed planet carrier has a greater torque. The increased torque of the planet carrier allows the portions of the axle shaft 124 past the first final drive 122a and second final drive 122b furthest from the differential and the first wheel 106a and second wheel 106b to rotate with a greater torque. The greater torque provided by the axle shaft 124, first wheel 106a, and second wheel 106b allow for loads of a greater mass and/or weight to be acted on by the vehicle 100.

Figure 2:
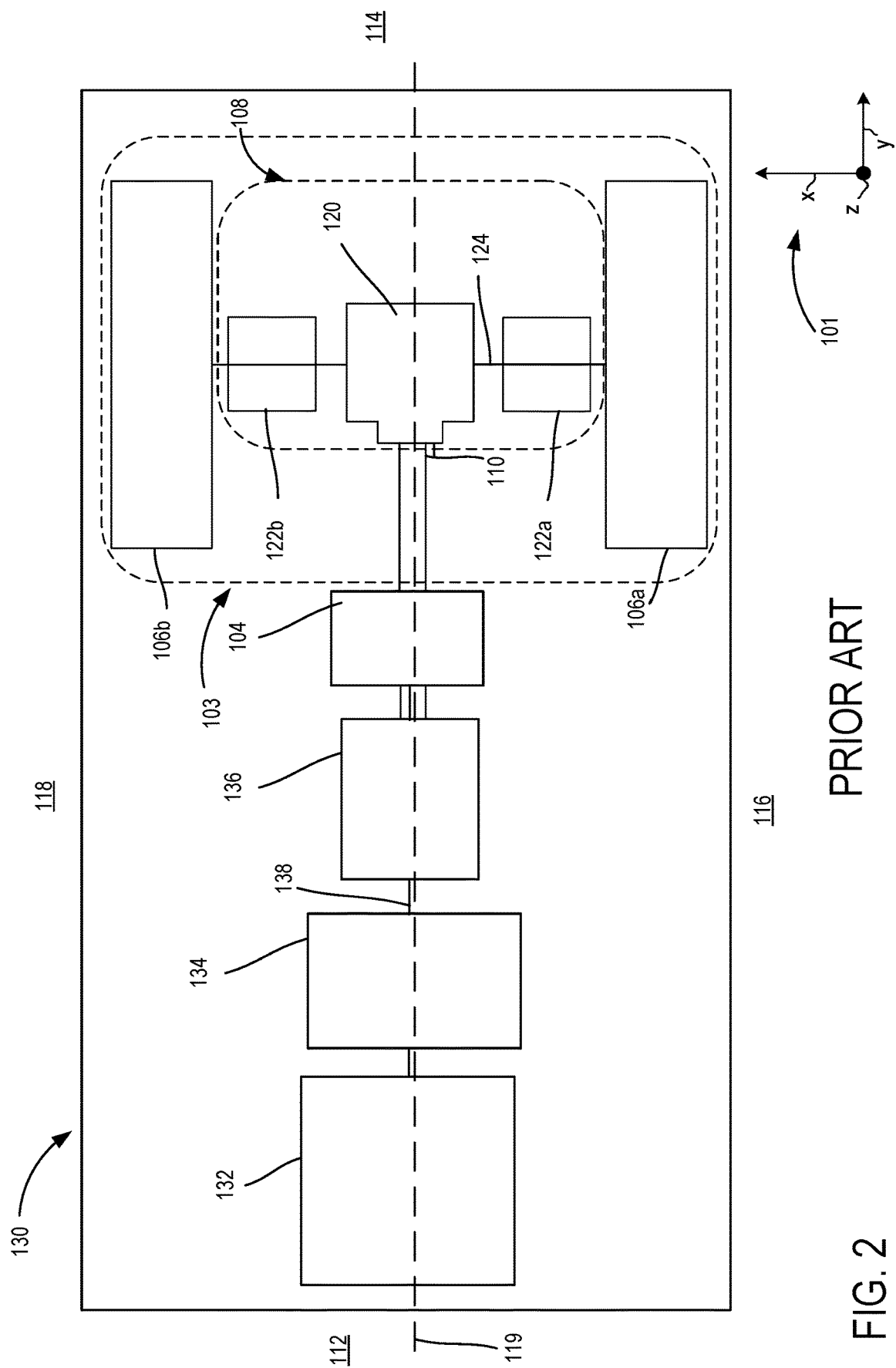
FIG. 2 depicts a block diagram of a second example vehicle according to the prior art.
Figure 3:
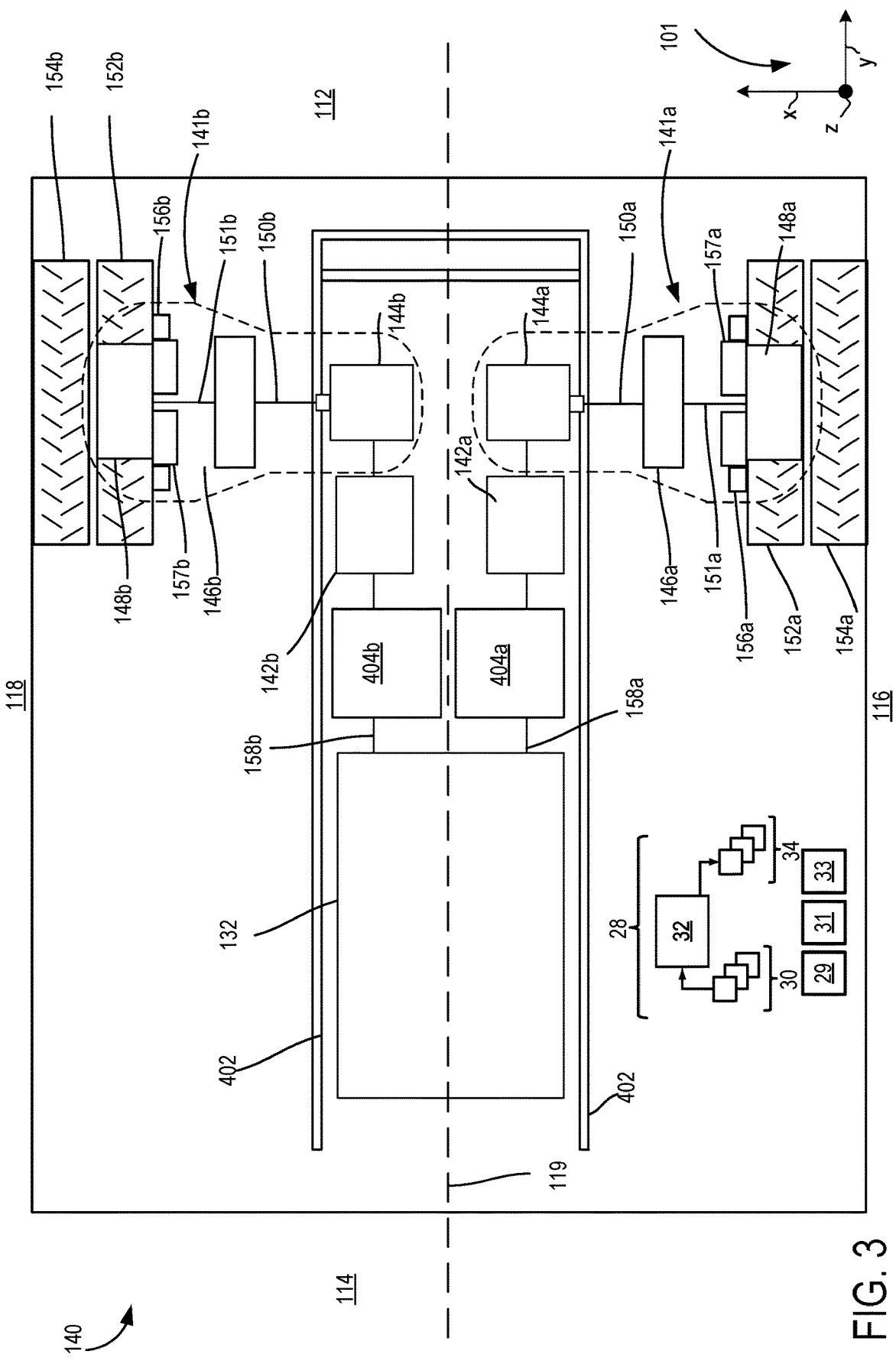
FIG. 3 depicts a block diagram of a wheel end driveline configuration, according to one or more examples of the present disclosure.

Turning to FIG. 2, FIG. 2 shows a block diagram of a second example vehicle 130 according to the prior art. It is noted that the vehicle 130 may also be referred to as electric vehicle 130 herein. The electric vehicle 130 comprises a battery 132 as a power source and an electric machine 136 as a prime mover. The mechanical energy provided by the electric machine 136 may be adjusted and controlled by the motor control unit 134. The electric vehicle 130 also has a transmission 104 and a driveline 103, wherein the driveline 103 comprises a first wheel 106a, a second wheel 106b, a drive axle 108, and similar components from FIG. 1. The electric vehicle 130 operates in a similar manner as the vehicle 100 in FIG. 1. Energy may be stored in a battery 132 as chemical energy. The battery 132 converts chemical energy into electrical energy. The electrical energy may be transferred to the electric machine 136. Wherein, electric machine may be an electric motor and/or a generator. The electric vehicle 130 does not produce any emissions and may be referred to as a zero emission vehicle.

The battery 132 may be electrically coupled to a motor control unit 134 and an electric machine 136. Connection 138 electrically couple components to the battery 132. In particular, connection 138 electrically couples the battery 132, motor control unit 134, and the electric machine 136. For the example in FIG. 2, the motor control unit 134 may comprise and/or be electrically coupled to an inverter that may convert direct current (DC) from the battery 132 into alternating current (AC) for the electric machine 136. For other examples, there may be a separate inverter between the battery 132 and the motor control unit 134 along the connection 138 that converts DC current of the battery 132 to AC current for the motor.

Electrical energy from the battery 132 to the electric machine 136 may be adjusted and controlled by the motor control unit 134. The rotational speed of and mechanical energy produced by the electric machine 136 may be adjusted and controlled by the motor control unit 134 and input from the transmission 104. Mechanical energy generated by the electric machine 136 may be transmitted to the transmission 104. The transmission 104 may transfer mechanical energy to the drive axle 108 through the drive shaft 110.

The driveline 103 comprising the drive axle 108, first final drive 122a, second final drive 122b, and drive shaft 110 of the electric vehicle 130 may function similarly to how previously described in FIG. 1. The drive shaft 110, differential assembly 120, the first wheel 106a, and second wheel 106b may function similarly to how previously described in FIG. 1. Wherein, the electric machine 136 generates and transfers torque via transmission 104 into the drive shaft 110, and the torque is transferred from drive shaft 110 to the differential assembly 120, axle shaft 124 and first and second wheels 106a, 106b, respectively. Therein, if the torque great enough to overcome the friction or other forces placed on the first and second wheels 106a, 106b, the drive shaft 110, components of the differential assembly 120, and axle shaft 124 may rotate. Therein, rotating the first and second wheels 106a, 106b with the axle shaft 124 and driving the vehicle in a direction. Wherein, the differential assembly 120, and the first final drive 122a and second final drive 122b the may also adjust the torque supplied to the first and second wheels 106a, 106b, respectively, during a turn. And, the first final drive 122a and second final drive 122b may also adjust the torque supplied to the first and second wheels 106a, 106b, respectively for the weight of a load on vehicle 130.

The first side 116 and second side 118 of electric vehicle 130 may be separated by a vehicle centerline 119. The vehicle centerline 119 is parallel with the y-axis. The vehicle centerline 119 may also divide the electric vehicle 130 into two symmetrical halves.

The vehicle 100, electric vehicle 130, and/or present disclosure electric vehicle (e.g., 140 in FIG. 3) may support or act upon an external object. The object may be referred to as a load, where the load comprises a weight. For one example, the vehicle 100, electric vehicle 130, and/or present disclosure electric vehicle (e.g., 140 in FIG. 3) may support the load, (e.g., carry the weight of the load). For another example, the vehicle 100, electric vehicle 130, and/or present disclosure electric vehicle may act upon the load, for example push or pull the load.

Turning now to FIG. 3, FIG. 3 shows a block diagram of off-highway vehicle 140, according to one or more examples of the present disclosure. In one or more examples, off-highway vehicle 140 may be a straddle carrier or a forklift truck. Off-highway vehicle 140 may also be referred to as an electric vehicle 140 herein. Electric vehicle 140 comprises a battery 132, a plurality of motor control units, a plurality of electric motors, a plurality of first reduction planetary gears, a plurality of second reduction planetary gears, a plurality of wheel shafts, a plurality of inner wheels, and a plurality of wheels.

In contrast to traditional prior art examples as shown at FIG. 1 and FIG. 2, electric vehicle 140 according to the present disclosure comprises separate wheel end drivelines supported via a vehicle frame 402, rather than the drive axle 108 and the drive shaft 110 configuration shown in the FIG. 1 and FIG. 2 prior art examples. The electric vehicle 140 has a first side wheel end driveline 141a coupled to the first side 116 and a second side wheel end driveline 141b coupled to the second side 118. The first side wheel end driveline 141a may act as a first wheel end driveline and the second side wheel end driveline 141b may act as a second wheel end driveline. These separate first and second side wheel end drivelines 141a, 141b are positioned coaxially with respect to wheels of the vehicle 140. Moreover, these separate first and second side wheel end drivelines 141a, 141b are positioned coaxially with respect to each other.

An example vehicle frame 402 is shown in further detail at FIG. 4A and FIG. 4B. Vehicle frame 402 may distribute the weight of a load more evenly compared to a drive axle 108. In contrast to the drive shaft 110 in FIGS. 1 and 2, it is noted that the vehicle frame 402 is not a rotating shaft. Rather, the vehicle frame 402 is non-rotating support structure. Off-highway vehicle 140 does not comprise a drive shaft such as drive shaft 110 in FIGS. 1 and 2.

The electric vehicle 140 may have driveline components specific to a first side 116 and specific to a second side 118 of electric vehicle 140. Compared to traditional vehicles such as the prior art examples shown at FIG. 1 and FIG. 2, a configuration comprising wheel end driveline components at the first side 116 and the second side 118 as described herein may be able to reduce the width of the off-highway vehicle 140 or another similar vehicle. Therein, the electric vehicle 140 does not have a drive shaft or a differential, such as drive shaft 110 and differential assembly 120 of FIG. 1 and FIG. 2.

Continuing with FIG. 3, the first side 116 of the vehicle system of present disclosure electric vehicle 140 may comprise one or more of a first side inverter 404a, e.g., a first inverter, a first side motor control unit 142a, a first side electric motor 144a, a first side first stage reduction planetary gears 146a (also referred to herein as first stage reduction planetary gears 146a), a first side second stage reduction planetary gears 148a (also referred to herein as second stage reduction planetary gears 148a), a first side first stage sun gear shaft 150a, a first side brake 156a, a first side inner wheel 152a, and a first side outer wheel 154a, in one or more examples.

The first side wheel end driveline 141a may comprise the first side electric motor 144a and a first side planetary reduction assembly. Wherein, the first side planetary reduction assembly, or first side planetary reduction gear assembly, comprises the first side first stage reduction planetary gears 146a (also referred to herein as first stage reduction planetary gears 146a), the first side first stage sun gear shaft 150a, the first side second stage reduction planetary gears 148a (also referred to herein as second stage reduction planetary gears 148a), the first side second stage sun gear shaft 151a, and the first side brake 156a, in one or more examples.

The second side 118 of the vehicle system of present disclosure electric vehicle 140 may comprise one or more of a second side inverter 404b, second side motor control unit 142b, a second side electric motor 144b, a second side first stage reduction planetary gears 146b (also referred to herein as first stage reduction planetary gears 146b), the second side first stage sun gear shaft 150b, a second side second stage reduction planetary gears 148b (also referred to herein as second stage reduction planetary gears 148b), a second side second stage sun gear shaft 151b, a second side inner wheel 152b, and a second side outer wheel 154b, in one or more examples.

For the present disclosure, the second side wheel end driveline 141b may comprise the second side electric motor 144b and a second side planetary reduction assembly. Wherein, the second side planetary reduction assembly, or second side planetary reduction gear assembly, comprises the second side first stage reduction planetary gears 146b, the second side first stage sun gear shaft 150b, the second side second stage reduction planetary gears 148b, the second side second stage sun gear shaft 151b, and the second side brake 156b, in one or more examples.

The first side electric motor 144a and second side electric motor 144b may be coaxially positioned with respect to one another.

In at least one example, the electric vehicle 140 may comprise more or fewer wheels on the first side 116 and on the second side 118. For example, the first side inner wheel 152a and the first side outer wheel 154a may instead be one wheel, and the second side inner wheel 152b and the second side outer wheel 154b may instead be one wheel. Additionally, or alternatively, there may be additional components specific to the first side 116 and the second side 118 without departing from the scope of the present disclosure.

The first side 116 and second side 118 of present disclosure electric vehicle 140 may be separated by a vehicle centerline 119, where the vehicle centerline 119 is parallel with the y axis. The vehicle centerline 119 may divide the present disclosure electric vehicle 140 into two symmetrical halves, in at least one example.

Electric vehicle 140 may comprise a control system 28, where the control system comprises sensors 30, a controller 32, and actuators 34. The controller 32 may comprise instructions stored in non-transitory memory to receive and execute torque requests and turn requests. Operator input device 29, turning input device 31, and braking input device 33 are further components of the off-highway vehicle 140 that form part of the control system. It is noted that the operator input device 29 may be an accelerator pedal, the turning input device 31 may be a steering wheel, and the braking input device 33 may be a brake pedal, in at least one example.

The controller 32 may be a central controller of electric vehicle 140. The controller 32 may receive various signals from sensors 30, and send control signals to various actuators 34 of the vehicle. These actuators 34 may include one or more of the first side electric motor 144a, the second side electric motor 144b, the first side brake 156a, and the second side brake 156b.

In at least one example, for controlling the first side electric motor 144a, the controller 32 may output a signal to a first side motor control unit 142a. The first side motor control unit 142a may in turn actuate the first side electric motor 144a. Similarly, for controlling the second side electric motor 144b, the controller 32 may output a signal to a second side motor control unit 142b, and the second side motor control unit 142b may in turn actuate the second side electric motor 144b. Additionally or alternatively, first side motor control unit 142a and second side motor control unit 142b may receive various signals from sensors 30 and actuate the first side electric motor 144a and the second side electric motor 144b, respectively, responsive to the signals received from the sensors 30. The first side motor control unit 142a and second side motor control unit 142b may be microcomputers, including a microprocessor unit, input/output ports, an electronic storage medium for executable programs.

The sensors 30 may include, one or more of temperature, pressure, rotations per minute (RPM), electrical current, and electrical voltage sensors. Moreover, the sensors 30 may further include an operator input sensor that detects an input received at operator input device 29 to determine a torque request. Additional sensors 30 may include a turning input sensor that detects an input received at a turning input device 31 and a brake input sensor that detects an input at braking input device 33.

The actuators 34 may include, one or more of solenoids, hydraulic throttles, and hydraulic brake actuators for actuating the first side brake 156a and the second side brake 156b. The actuators 34 may include electrical components to control operation of the first side electric motor 144a and the second side electric motor 144b. Electrical components of the actuators 34 may include, for example, inverters, electrical gates, bus bars, capacitors, and resistors.

The battery 132 may be electrically coupled to a first side motor control unit 142a and first side electric motor 144a. A first side connection 158a electrically couple components on the first side 116 of the vehicle together and to the battery 132. A first side connection 158a electrically couples the battery 132, the first side inverter 404a, the first side motor control unit 142a, and the first side electric motor 144a. The battery 132 may be electrically coupled to the first side motor control unit 142a through a first side inverter 404a. The first side inverter 404a may convert DC from the battery 132 into AC for the first side motor control unit 142a and first side electric motor 144a.

In at least one example, the first side electric motor 144a may be coupled to the first side first stage sun gear shaft 150a. For another example first side electric motor 144a may be coupled to first side first stage sun gear shaft 150a and first side first stage reduction planetary gears 146a. The first side first stage sun gear shaft 150a may be connected to the first side first stage reduction planetary gears 146a and the output of first side first stage reduction planetary gears 146a may connected to first side second stage sun gear shaft 151a and first side second stage reduction planetary gears 148a. The first side inner wheel 152a and first side outer wheel 154a, may be coupled to the output of first side second stage reduction planetary gears 148a closest to the first side 116 of the present disclosure electric vehicle 140. As shown in FIG. 3, for one example the wheel hub 157a may be coupled to the first side inner wheel 152a. For this example, the first side inner wheel 152a may be coupled to the first side outer wheel 154a. For, another example the wheel hub 157a may between and coupled to the first side inner wheel 152a and coupled to the first side outer wheel 154a. However, it is to be appreciated that the coupling between the wheel hub 157a and/or first side inner wheel 152a and first side outer wheel 154a is non-limiting, and other coupling configurations have been contemplated and considered. Therein, the first side wheel end driveline 141a is a driveline that may couple a first wheel (e.g., first side inner wheel 152a) to the first wheel end motor (e.g., the first side electric motor 144a).

The battery 132 may be electrically coupled to a second side motor control unit 142b and second side electric motor 144b. A second side connection 158b electrically couple components on the second side 118 of the vehicle together and to the battery 132. A second side connection 158b electrically couples the battery 132, the second side inverter 404b, the second side motor control unit 142b, and the second side electric motor 144b. The battery 132 may be electrically coupled to the second side motor control unit 142b through a second side inverter 404b. The battery 132 may be electrically coupled to the second side motor control unit 142b through a second side inverter 404b. The second side inverter 404b may convert direct current (DC) from the battery 132 into alternating current (AC) for the second side motor control unit 142b and second side electric motor 144b.

In at least one example, the second side electric motor 144b may be coupled to the second side first stage sun gear shaft 150b that is separate from the first side first stage sun gear shaft 150a. Further, in one or more examples, the second side electric motor 144b may be coupled to second side first stage sun gear shaft 150b and second side first stage reduction planetary gears 146b. The second side first stage sun gear shaft 150b may connect the second side first stage reduction planetary gears 146b and the output of second side second stage reduction planetary gears 148b may be connected to second side second stage sun gear shaft 151b and second side second stage reduction planetary gears 148b.

The second side inner wheel 152*b* and second side outer wheel 154*b*, may be coupled to the output of second side second stage reduction planetary gears 148*b* closest to the second side 118 of the present disclosure electric vehicle 140. As shown in FIG. 3, for one example the wheel hub 157*b* may be coupled to the second side inner wheel 152*b*. For this example, the second side inner wheel 152*b* may be coupled to the second side outer wheel 154*b*. For, another example the wheel hub 157*b* may be located between and coupled to the second side inner wheel 152*b* and second side outer wheel 154*b*. However, it is to be appreciated that the coupling between the wheel hub 157*b* and/or the second side inner wheel 152*b* and second side outer wheel 154*b* may be non-limiting, and other coupling configurations have been contemplated and considered. Therein, the second side wheel end driveline 141*b* is a driveline that may couple a second wheel (e.g., second side inner wheel 152*b*) to the second side wheel end motor (e.g., the second side electric motor 144*b*).

The battery 132 provides electrical energy to the first side electric motor 144*a* and the second side electric motor 144*b*. The first side motor control unit 142*a* controls electrical energy provided by the battery 132 and rotational speed (e.g., RPM) of the first side electric motor 144*a*. The second side motor control unit 142*b* controls electrical energy provided by the battery 132 and rotational speed (e.g., RPM) of the second side electric motor 144*b*.

The first side electric motor 144*a* and second side electric motor 144*b* may be controlled at least partially by a control system 28 including a first side motor control unit 142*a* and a second side motor control unit 142*b*. The control system 28 may receive torque requests via the operator input device 29 that may act as a torque input device. The control system 28 may receive turning input via turning input device 31. The controller 32 of the control system 28 may communicate the torque and/or turning input request to the first side motor control unit 142*a* and second side motor control unit 142*b*. The first side motor control unit 142*a*, second side motor control unit 142*b*, and controller 32 may adjust the torque of the first side wheel end motor, (e.g., electric motor 144*a*), and second side wheel end motor, (e.g., electric motor 144*b*), for a torque and/or turn request. Therein, adjusting the speed of the first wheels, (e.g., first side wheels 152*a*, 154*a*), and the second wheels, (e.g., second side wheels 152*b*, 154*b*), respectively.

The first side motor control unit 142*a* may receive various signals from sensors 30 coupled to the first side electric motor 144*a*, and send control signals to various actuators 34 coupled to the second side electric motor 144*b* and/or present disclosure electric vehicle 140. The first side motor control unit 142*a* may also receive various signals from sensors coupled to the first side electric motor 144*a* and send control signals to various electrical components, such as the first side inverter 404*a*. Control signals sent to the first side inverter 404*a* from the first side motor control unit 142*a* may change the voltage supplied to the first side electric motor 144*a*. The second side motor control unit 142*b* may also receive various signals from sensors coupled to the second side electric motor 144*b* and send control signals to various electrical components such as the second side inverter 404*b*. Control signals sent to the first side inverter 404*a* from the first side motor control unit 142*a* may change the voltage supplied to the first side electric motor 144*a*. The first side motor control unit 142*a* and second side motor control unit 142*b* may comprise instructions store in non-transitory memory executable to receive torque requests, turn requests, and other requests to change the conditions of the first and second side electric motors 144*a*, 144*b*. Data may be communicated between and used to adjust programming in first side motor control unit 142*a* and second side motor control unit 142*b*. The first side motor control unit 142*a* may adjust the first side electric motor 144*a* to rotate the first side wheels 152*a*, 154*a* at a different speed based on a torque request, a turn input, and/or other data. The second side motor control unit 142*b* may adjust the second side electric motor 144*b* to rotate the second side wheels 152*b*, 154*b* at a different speed based on a torque request, a turn input, and/or other data. Data communicated between the first side motor control unit 142*a*, second side motor control unit 142*b*, and controller 32 may be used to adjust conditions in the first side electric motor 144*a*, second side electric motor 144*b*, and actuators 34 throughout the present disclosure electric vehicle 140. The communication between the second side motor control unit 142*b* and first side motor control unit 142*a* may change conditions in the first side electric motor 144*a* and second side electric motor 144*b* to prevent unintentional movement or degradation.

The communication between the first side motor control unit 142*a* and second side motor control unit 142*b* may prevent the first side electric motor 144*a* and second side electric motor 144*b* from moving at different rates. For one example, if the first side electric motor 144*a* turns off, the first side motor control unit 142*a* will send a signal to the second side motor control unit 142*b* to turn off the second side electric motor 144*b*. For another example, if the second side electric motor 144*b* turns off, the second side motor control unit 142*b* may send a signal to the first side motor control unit 142*a* to turn off the first side electric motor 144*a*.

The electric vehicle 140 may be able to turn without a differential assembly 120 or drive axle 108, or the overall transmission approach, as shown in FIG. 1 and FIG. 2. In particular, rather than the differential assembly 120 and drive axle 108 configuration disclosed in the prior art examples at FIG. 1 and FIG. 2, the second side motor control unit 142*b* may govern the second side electric motor 144*b* to move at a different speed from the first side electric motor 144*a*, and the first side motor control unit 142*a* may govern the first side electric motor 144*a* to move at a different speed from the second side electric motor 144*b* to avoid slip during a turn. In particular, when the electric vehicle 140 is being turned while being propelled, the wheels at an inside of the turn, e.g., the wheel closest to the direction of the turn, are operated with a reduced RPM compared to the wheels at an outside of the turn, e.g., the wheels farthest from the direction of the turn, to prevent slipping.

As one example, if electric vehicle 140 turns towards the first side 116 of the electric vehicle 140, the first side motor control unit 142*a* and second side motor control unit 142*b* signal to the first side electric motor 144*a* and the second side electric motor 144*b*, respectively, to output different torques and thus rotate the corresponding wheels at different RPMs. For this example, where the electric vehicle 140 is turned towards the first side 116, the first side wheels 152*a*, 154*a* are at an inside of the turn and the second side wheels 152*b*, 154*b* are at an outside of the turn. Thus, the first side wheels 152*a*, 154*a* are operated at a lower RPM than the second side wheels 152*b*, 154*b* when turning the electric vehicle 140 towards the first side 116.

If electric vehicle 140 turns towards the second side 118, the first side wheels 152*a*, 154*a* are at an outside of the turn and the second side wheels 152*b*, 154*b* are at an inside of the turn. Thus, when turning the electric vehicle 140 towards the second side 118 while propelling the electric vehicle 140, the first side electric motor 144a and the second side electric motor 144b are operated to provide different torque outputs such that the second side wheels 152b, 154b are operated at a lower RPM than the first side wheels 152a, 154a.

A brake may be directly incorporated on a wheel hub. FIG. 3 shows a first side brake 156a which is on wheel hub 157a closest to the first side 116. FIG. 3 also shows a second side brake 156b which is on wheel hub 157b closest to the second side 118. The first side brake 156a may slow or stop the rotation of the first side wheels 152a, 154a. The second side brake 156b may slow or stop the rotation of the second side wheels 152b, 154b. The first side brake 156a and second side brake 156b are dynamic brakes, such as dynamic hydraulic brakes.

Dynamic brakes are configured to allow a brake to stop or hold a load and may reduce brake actuating fluid, such as oil, used for braking and other hydraulic systems. Dynamic brakes may be connected to a control system to predict the torque and RPM in the wheels, and adjust the frictional force provided during braking. Dynamic brakes may reduce the power losses and increase mechanical efficiency when the first side brake 156a and second side brake 156b are engaged to slow the rotation of the first side inner wheel 152a, second side inner wheel 152b, first side outer wheel 154a, and second side outer wheel 154b.

For one example, when the electric vehicle 140 receives a brake request, the first side brake 156a and second side brake 156b apply equal force when engaged to slow or stop the rotation of the first side inner wheel 152a, second side inner wheel 152b, first side outer wheel 154a, and second side outer wheel 154b.

For another example, the torque and RPM of the wheels and side wheel shafts on the first side 116 and second side 118 are unequal. For this other example, the first side brake 156a and second side brake 156b apply unequal force when engaged to slow or stop the rotation of the wheel hub 157a on the first side 116 at a similar rate to the wheel hub 157b on the second side 118. For this example, the first side brake 156a and second side brake 156b apply unequal force when engaged to slow or stop the rotation of the first side inner wheel 152a and first side outer wheel 154a at a similar rate to the second side inner wheel 152b and second side outer wheel 154b.

Turning now to FIG. 4A, FIG. 4A shows an isometric view of an off-highway vehicle 400 with the vehicle frame 402, and the first and second side wheel end drivelines 408a and 408b, according to one or more examples of the present disclosure. FIG. 4B shows an overhead view from perspective along the z-axis down onto the off-highway vehicle 400. The off-highway vehicle 400 shown in FIG. 4A and FIG. 4B is an off-highway vehicle powered by electricity that may be the same or similar to the electric vehicle 140 illustrated in FIG. 3. In one or more examples, off-highway vehicle 400 may also be referred to herein as electric vehicle 400.

As seen in FIG. 4A and FIG. 4B, the electric vehicle 400 comprises a vehicle frame 402. The vehicle frame 402 is substantially U-shaped, with the rear side 114 of the vehicle frame 402 forming a closed end of the U-shape and the front side 112 of the vehicle frame 402 forming an open end of the U-shape. The first side 116 and the second side 118 of the vehicle frame 402 comprise arms of the U-shaped vehicle frame 402. However, the features of the frame 402 relative to the location of the front side 112 and rear side 114 may be non-limiting. For other examples of alterative embodiments of electric vehicle 400, the vehicle frame 402 is substantially U-shaped, with the front side 112 of the vehicle frame 402 forming a closed end of the U-shape and the rear side 114 of the vehicle frame 402 forming an open end of the U-shape.

As shown, the vehicle frame 402 may support one or more of a first side inverter 404a, a second side inverter 404b, a first side wheel end driveline 408a, and a second side wheel end driveline 408b. FIG. 4A and FIG. 4B also shows the electric vehicle 400 comprises one or more of a first side motor control unit 142a, a second side motor control unit 142b, a first side electric motor 144a, and a second side electric motor 144b shown in FIG. 3.

The first side inverter 404a, second side inverter 404b, first side electrical wires 406a, and second side electrical wires 406b are enclosed by the vehicle frame 402. The battery 132, first side motor control unit 142a, the second side motor control unit 142b, the first side electric motor 144a, and the second side electric motor 144b are enclosed by the vehicle frame 402. Portions of first side wheel end driveline 408a may be partially enclosed by and coupled to the first frame flange 414a and vehicle frame 402 on the first side 116 of the off-highway vehicle 400. Portions of the second side wheel end driveline 408b may be partially enclosed by and coupled to the second frame flange 414b and the vehicle frame 402 on the second side 118 of the off-highway vehicle 400. Much of the first side wheel end driveline 408a and second side wheel end driveline 408b are outside the borders of the vehicle frame 402. Portions of the first side wheel end driveline 408a and second side wheel end driveline 408b are external to the vehicle frame 402. The first side inverter 404a, first side electrical wires 406a, first side motor control unit 142a, first side electric motor 144a, and first side wheel end driveline 408a are closer to the first side 116 of the vehicle frame 402. The second side inverter 404b, second side motor control unit 142b, second side electric motor 144b, and second side wheel end driveline 408b are closer to the second side 118 of the vehicle frame 402.

As seen in FIG. 4A and FIG. 4B, the vehicle frame 402, the first and second side wheel end drivelines 408a, 408b, respectively, are used in place of the drive axle 108 and drive shaft 110 configuration shown in FIG. 1 and FIG. 2. The first and second side wheel end drivelines 408a, 408b may be the same or similar as first and second side wheel end drivelines 141a and 141b, respectively, of off-highway vehicle 140.

The first and second side wheel end drivelines 408a, 408b provide a function similar to a traditional driveline 103 and drive axle 108 shown in FIG. 1-2 by supporting and transferring torque for rotation of wheels. However, the first and second side wheel end drivelines 408a, 408b result in off-highway vehicle 400 being more compact than the vehicles shown in FIGS. 1-2 due to off-highway vehicle 400 not including the drive shaft 110 and not including the differential assembly 120, and vehicle frame 402 is able to distribute greater loads over a shorter width. Additionally, the lack of a drive shaft 110 or differential assembly 120 reduces the number of moving components, and therein may reduce the quantity of lubricating oil used to lubricate first and second side wheel end drivelines 408a, 408b compared to a more traditional driveline.

The first side inverter 404a and second side inverter 404b may be used to convert direct current into an alternating current for first and second side electric motors 144a, 144b, respectively. The battery 132 shown in FIG. 3 may electrically couple to the first side inverter 404a and the second side inverter 404b. The first side inverter 404a may be electrically coupled to the first side motor control unit 142a and first side electric motor 144a through first side electrical wires 406a. The second side inverter 404b may be electrically coupled to the second side motor control unit 142b and second side electric motor 144b through second side electrical wires 406b.

The off-highway vehicle 400 may contain a first side wheel end driveline 408a and a second side wheel end driveline 408b. The first side electric motor 144a may be mechanically coupled to, and form part of, the first side wheel end driveline 408a. The second side electric motor 144b may also be mechanically coupled to, and form part of, the second side wheel end driveline 408b.

The first side wheel end driveline 408a may act as a first wheel end driveline and be positioned coaxially with respect to a first wheel, such as the first side inner wheel 152a of FIG. 3. The first wheel end driveline comprises a first side wheel end motor, (e.g., first side electric motor 144a) and a first brake housing, (e.g., such as brake housing 702 of FIG. 7A), wherein the first side wheel end motor may be coupled to the first brake housing. Therein, the first side wheel end driveline 408a may act as a driveline coupling the first wheel to first wheel end motor. The second side wheel end driveline 408b may act as a second wheel end driveline and be positioned coaxially with respect to a second wheel or wheels, such as the second side inner wheel 152b of FIG. 3. The first wheel end driveline comprises a second side wheel end motor, (e.g., second side electric motor 144b) and a second brake housing, (e.g., such as brake housing 702 of FIG. 7A), wherein the first side wheel end motor may be coupled to the first brake housing. Therein, the second side wheel end driveline 408b may act as a driveline coupling the second wheel to the second side wheel end motor.

FIG. 4A and FIG. 4B show the vehicle frame 402 comprises a plurality of frame flanges, including a first frame flange 414a and a second frame flange 414b. FIG. 4A and FIG. 4B show the first frame flange 414a on the first side 116 of the vehicle frame 402. FIG. 4A and FIG. 4B show there may be the second frame flange 414b on the second side 118 of the vehicle frame 402. The first side wheel end driveline 408a and second side wheel end driveline 408b may each comprise a driveline flange (e.g., 410 in FIG. 5 and FIG. 7A). A driveline flange 410 may be coupled to a frame flange (e.g., 414 in FIG. 7A) through frame fasteners 412.

The first side wheel end driveline 408a may comprise a first driveline flange 410a. The second side wheel end driveline 408b may comprise a second driveline flange 410b. The first driveline flange 410a may couple the first side wheel end driveline 408a to the first frame flange 414a and the first side 116 of the vehicle frame 402. The second driveline flange 410b may couple the second side wheel end driveline 408b to the second frame flange 414b and the second side 118 of the vehicle frame 402.

Figure 5:
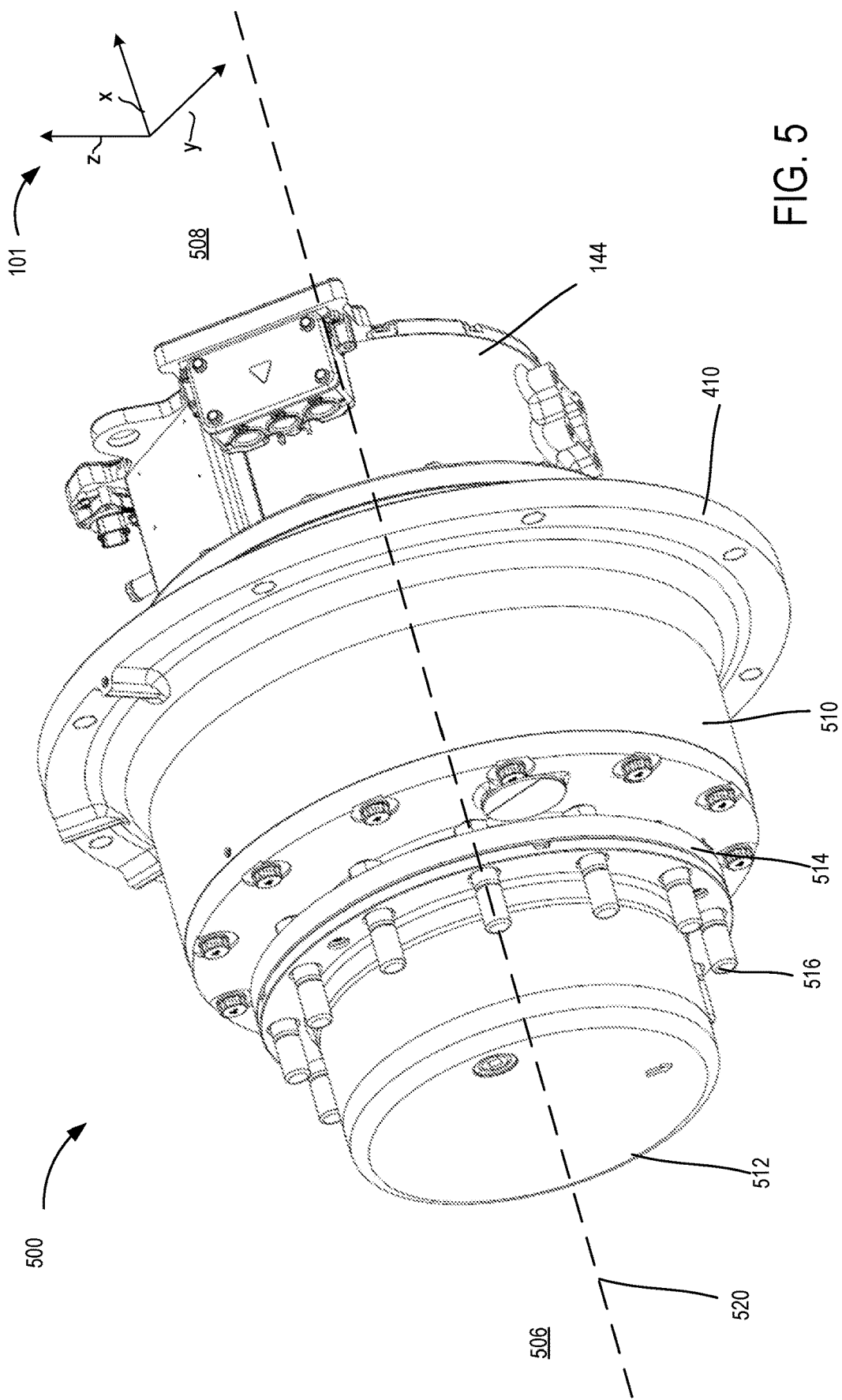
FIG. 5 depicts an assembled wheel end driveline motor assembly, according to one or more examples of the present disclosure.

FIG. 5 shows an exterior view of the wheel end driveline motor assembly 500. As seen in FIG. 5, the wheel end driveline motor assembly 500 may be the same or similar to the first side wheel end driveline 408a or the second side wheel end driveline 408b shown in FIG. 4A and FIG. 4B, in one or more examples. Further, the electric motor 144 may be the same or similar to the first side electric motor 144a or the second side electric motor 144b shown in FIG. 4A and FIG. 4B.

The wheel end driveline motor assembly 500 may comprise a wheel side 506 and a frame side 508. The wheel side 506 of the wheel end driveline motor assembly 500 may be closest to and face the wheels of the vehicle (e.g., wheels of electric vehicle 140). The frame side 508 of the wheel end driveline motor assembly 500 may be closest to the frame of the vehicle.

FIG. 5 shows the wheel end driveline motor assembly 500 may comprise a spring actuated hydraulic release brake assembly 510, a second planetary gear box 512, and a hub stud assembly 514. The electric motor 144 may be fastened to the frame side 508 of the second planetary gear box 512. Second planetary gear box 512 may be fastened to the wheel side 506 of the hub stud assembly 514.

As seen in FIG. 5, the driveline flange 410 (which may be the same or similar to the driveline flanges 410a, 410b from FIG. 4A-4B) may encircle the circumference of the spring actuated hydraulic release brake assembly 510. Therein, the spring actuated hydraulic release brake assembly 510 may be integrated into the wheel end driveline motor assembly 500 as an integrated spring actuated hydraulic release assembly. The brake assembly 510 contains the components of a dynamic brake that may be an integrated in the wheel end driveline motor assembly 500. The dynamic brake may slow or stop the rotation of the hub stud assembly 514. The hub stud assembly 514 may be fastened or coupled to a single or a plurality of wheels. Therein, the dynamic brake may slow or stop the rotation of a single or a plurality of wheels fastened or coupled to the wheel end driveline motor assembly 500.

The second planetary gear box 512 and hub stud assembly 514 may be coupled or fastened together through a plurality of second planetary reduction fasteners 516, such as lug nuts. Additionally, the second planetary reduction fasteners 516 may couple or fasten a single wheel or a plurality of wheels to the second planetary gear box 512 and hub stud assembly 514.

The wheel end driveline motor assembly 500 may be aligned with an axis of rotation 520 (e.g., such that axis of rotation 520 may be circumferentially surrounded by and be substantially collinear with a centerline through wheel end driveline motor assembly 500) and that the axis of rotation 520 may also be substantially parallel (e.g., parallel within 5%) with the x axis. The length of the wheel end driveline motor assembly 500 may be substantially parallel with the x axis and axis of rotation 520, and the width of the wheel end driveline motor assembly 500 may be substantially parallel with y-axis. The height of the wheel end driveline motor assembly 500 may be substantially parallel with z-axis.

Figure 6:
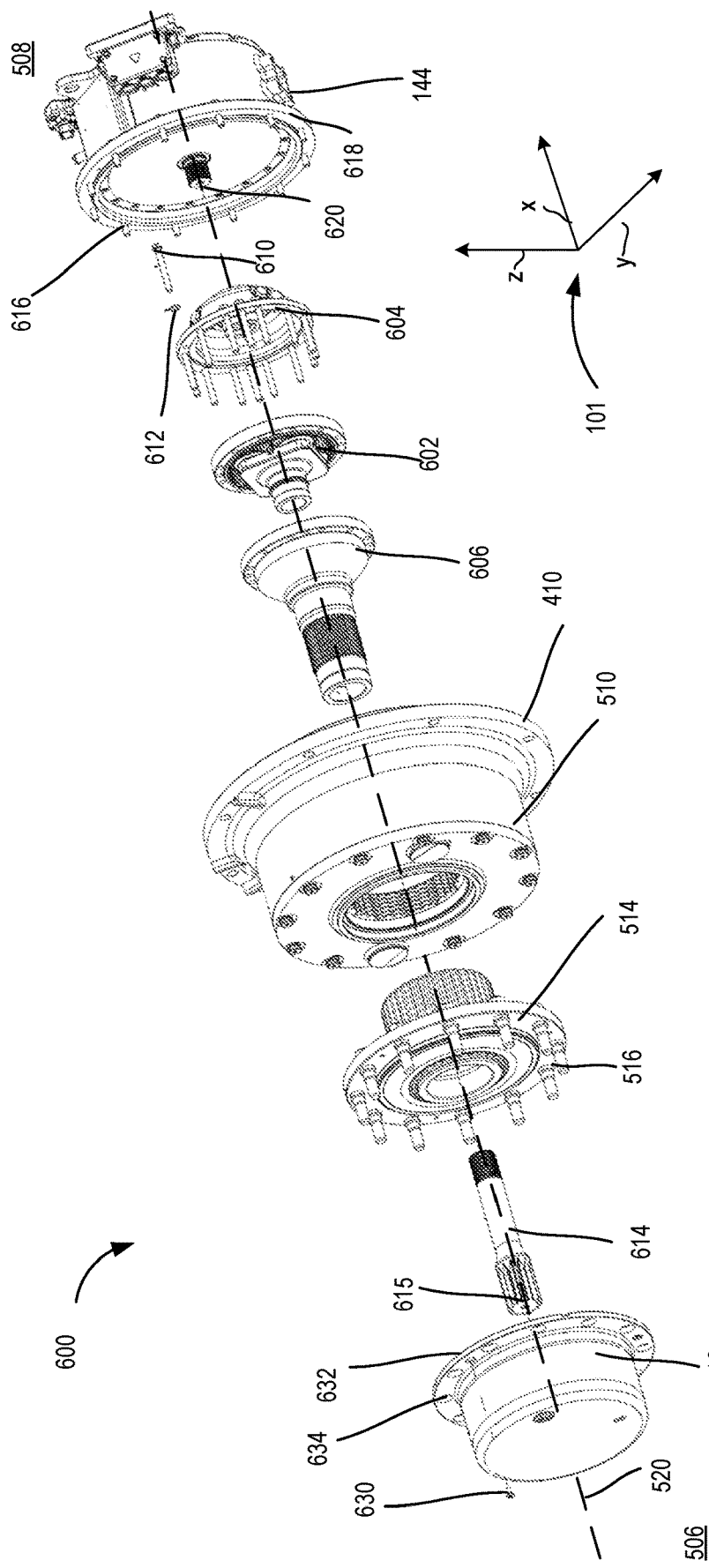
FIG. 6 depicts an exploded view of the wheel end driveline motor assembly, according to one or more examples of the present disclosure.

Turning now to FIG. 6, FIG. 6 shows an exploded view of a wheel end driveline motor assembly 600. Wheel end driveline motor assembly 600 may be the same or similar to wheel end driveline motor assembly 500 in FIG. 5.

As seen in FIG. 6, the driveline motor assembly 600 comprises a first planetary reduction assembly that may be referred to herein as a first planetary gear box 602. The first planetary gear box 602 may be coupled between the retainer of bearing and seal 604 and the spindle 606 in the assembled state.

Continuing, FIG. 6 additionally shows a plurality of first planetary reduction fasteners 610 that may be threaded through a plurality of spacers 612 and into through apertures in the retainer of bearing and seal 604. The plurality of first planetary reduction fasteners 610 may also be threaded and aligned through apertures in the first planetary gear box 602 and in the spindle 606.

When threaded, the first planetary reduction fasteners 610 fasten the first planetary gear box 602 to the retainer of bearing and seal 604, and further fasten the spindle 606 to the first planetary gear box 602. The spindle 606 may pass through the spring actuated hydraulic release brake assembly 510, the hub stud assembly 514, and the second planetary gear box 512 in the assembled state.

A sun shaft 614 may pass through the hub stud assembly 514 and into the second planetary gear box 512. One end of the sun shaft 614 comprises a sun shaft pinion 615 that may be inserted into the second planetary gear box 512. Electric motor 144 may be fastened to the spring actuated hydraulic release brake assembly 510 using motor fasteners 616. The motor fasteners 616 may be threaded into and through apertures in a motor flange 618 and into apertures in the spring actuated hydraulic release brake assembly 510 aligned along the x axis.

When the driveline motor assembly 600 is assembled, the motor flange 618 may enclose and seal the first planetary gear box 602, the retainer of bearing and seal 604, and the spindle 606 within the spring actuated hydraulic release brake assembly 510. The motor drive shaft 620 may also pass through the retainer of bearing and seal 604 and be threaded into the first planetary gear box 602, where the motor drive shaft 620 is configured to rotate the sun gear of the first planetary gear box 602.

The second planetary reduction assembly in the form of the second planetary gear box 512 may be fastened to the hub stud assembly 514 using second planetary reduction fasteners 516. The second planetary reduction fasteners 516 may be threaded into through apertures 634 in a second planetary reduction flange 632 and into aligned through apertures in the hub stud assembly 514.

Figure 7A:
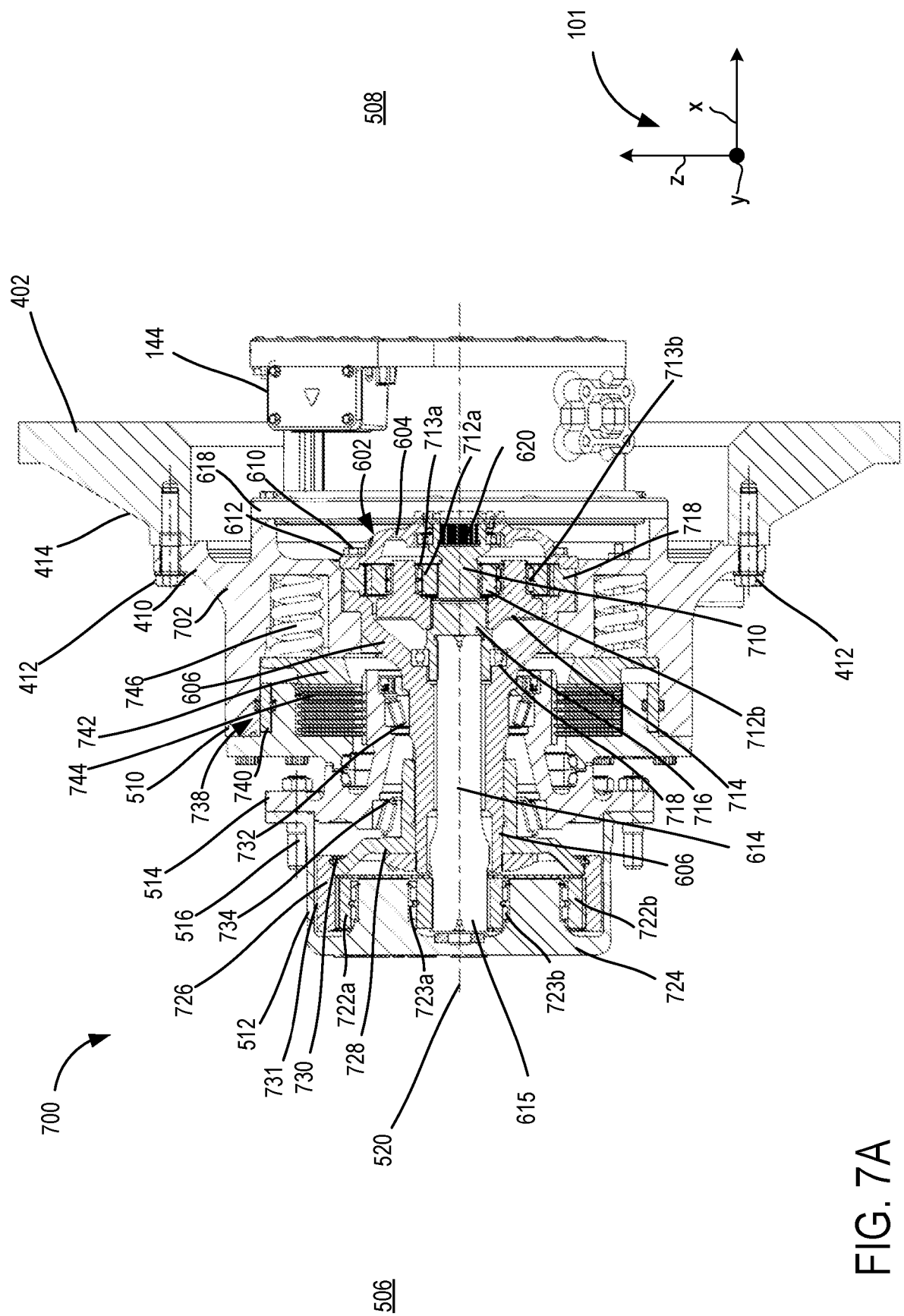
FIG. 7A is a cutaway view of the wheel end driveline motor assembly, according to one or more examples of the present disclosure.

Looking now to FIG. 7A, FIG. 7A shows a cross-section a wheel end driveline motor assembly 700 in an assembled state. The wheel end driveline motor assembly 700 may be the same or similar to wheel end driveline motor assembly 500 or wheel end driveline motor assembly 600. The cross-section taken on the wheel end driveline motor assembly 700 may be on the axis of rotation 520 and coplanar with a plane formed by the z and x axes.

FIG. 7A shows the electric motor 144 may be mounted on brake housing 702 as a part of spring actuated hydraulic release brake assembly 510. Therein, the electric motor 144 may be mounted to the vehicle frame 402 via the brake housing 702. In particular, the electric motor 144 may be directly coupled to the brake housing 702 at motor flange 618, and the brake housing 702 may be directly coupled to the vehicle frame 402. It is further noted that the vehicle frame 402 surrounds a portion of the electric motor 144.

The brake housing 702 may act as a structural support member between the driveline and chassis of the vehicle (e.g., off-highway vehicle 140). For example, looking briefly to FIG. 4A and FIG. 4B, it can be seen that the first side brake housing and the second side brake housing are coupled to the vehicle frame and extend outward from the vehicle frame. The first side of the vehicle frame and the second side of the vehicle frame is thus positioned between the first side brake housing and the second side brake housing. Due to this positioning, the first and second side brake housings may act as structural support members.

Looking back now to FIG. 7A, it can be seen that the brake housing 702 is a part of the spring actuated hydraulic release brake assembly 510, and the electric motor 144 may be fastened and/or coupled to the brake housing 702. The first planetary gear box 602, a retainer of bearing and seal 604, and a spindle 606 may further be enclosed by and fastened to the brake housing 702 with first planetary reduction fasteners 610. As seen in FIG. 7A, the motor flange 618 may enclose and seal the first planetary gear box 602, a retainer of bearing and seal 604, and a spindle 606 within the spring actuated hydraulic release brake assembly 510.

The motor drive shaft 620 may also pass through and be fitted to the retainer of bearing and seal 604 and be coupled via a spline connection into the first planetary gear box 602. The motor drive shaft 620 may fit into a sun gear shaft 710 that is part of the first planetary gear box 602. FIG. 7A shows surrounding and interlocking with the sun gear shaft 710 are the first planetary gears 712a, 712b.

A first planetary carrier assembly 714 is the supporting member of and houses the first planetary gears 712a, 712b and of first planetary gear box 602. The first planet or first planetary gears 712a, 712b may be supported by and mechanically coupled to the planetary carrier assembly 714 via planetary bearings 713a, 713b, respectively. Therein, the first planetary gears 712a, 712b may act as first planetary reduction gears, or first stage planetary reduction gears, for the first planetary reduction assembly, e.g. the first planetary gear box 602. The first planetary carrier assembly 714 may also house and support a portion of the sun gear shaft 710. The first planetary carrier assembly 714 may be supported by a first ring gear 718. The plurality of first planetary gears 712a, 712b may be housed between the sun gear shaft 710 and inner radius of the first ring gear 718. It is to be appreciated there may be more first planetary gears than first planetary gears 712a and 712b shown in FIG. 7A. It is to be appreciated that there may be more planetary bearings than planetary bearings 713a and 713b. As one example, there may be four first planetary gears similar to first planetary gears 712a and 712b and four first planetary bearings similar to via planetary bearings 713a and 713b housed in the first planetary carrier assembly 714. However, it is to be appreciated there may be less or more first planetary gears and first planetary bearings in the first planetary carrier assembly 714.

The sun gear shaft 710 may be coupled to the motor drive shaft 620. For one example, the sun gear shaft 710 may have internal splines and the motor drive shaft 620 may have external splines. For this example, the internal splines of a sun gear shaft 710 may interlock with the splines of the motor drive shaft 620 of the electric motor 144. However, it should be appreciated that the features of the sun gear shaft 710 and motor drive shaft 620, such as the splines, may be non-limiting. Therein, there may be other methods to couple or fasten the sun gear shaft 710 to the motor drive shaft 620, and alternative methods have been contemplated.

The sun gear shaft 710 has external teeth. The external teeth of the sun gear shaft 710 may be interlocked with the teeth of the first planetary gears 712a, 712b of first planetary gear box 602.

Additionally, FIG. 7A shows the sun shaft 614 may be inserted into and enclosed by the spindle 606 when the wheel end driveline motor assembly 500 is fully assembled. FIG. 7A also shows the sun shaft 614 may be inserted into and coupled to the through output sleeve 716. FIG. 7A shows that the sun shaft 614 may be coupled to the first planetary gear box 602 through the through output sleeve 716.

The through output sleeve 716 may mechanically couple the first planetary carrier assembly 714 of first planetary gear box 602 to the sun shaft 614. The motor drive shaft 620 may also be mechanically coupled to the through output sleeve 716 and the first planetary carrier assembly 714 through the interlocking teeth of sun gear shaft 710 to the first planetary gears 712a, 712b. The through output sleeve 716 may be housed within the spindle 606, and the first planetary carrier assembly 714 may be coupled to the through output sleeve 716.

In one or more examples, splines may be used to couple components such as the sun shaft 614, the through output sleeve 716, and first planetary carrier assembly 714. In some examples, the through output sleeve 716 may have external splines and the first planetary carrier assembly 714 may have internal splines. In such examples, the external splines of the through output sleeve 716 may complement and mesh with the internal splines of first planetary carrier assembly 714 coupling the two components together.

In other examples, the sun shaft 614 may have external splines and the through output sleeve 716 may have internal splines. For these other examples, the external splines of the sun shaft 614 may interlock with the internal splines of the through output sleeve 716, coupling the two components together. However, there may be other methods to couple the sun shaft 614 to the through output sleeve 716 and/or the through output sleeve 716 to the first planetary carrier assembly 714, and alternative methods have been contemplated.

FIG. 7A shows a second planetary carrier assembly 724 supporting and housing the second planetary gears 722a, 722b of the second planetary gear box 512. The second planet gears or second planetary gears 722a, 722b may be supported by and mechanically coupled to the second planetary carrier assembly 724 via planetary bearings 723a, 723b, respectively. Therein, the second planetary gears 722a, 722b may act as second planetary reduction gears, such as second stage planetary reduction gears, for the second planetary reduction assembly, e.g. the second planetary gear box 512. The second planetary carrier assembly 724 of the second planetary gear box 512 may support a second ring gear 726. The plurality of second planetary gears 722a, 722b may be housed between the sun shaft pinion 615 of the sun shaft 614 and inner radius of the second ring gear 726 of the second planetary gear box 512. The second ring gear 726 may be housed inside the second planetary gear box 512. The second planetary carrier assembly 724 may house the second planetary gears 722a, 722b when the wheel end driveline motor assembly 500 is fully assembled, and the second planetary carrier assembly 724 may couple to the hub stud assembly 514. It is to be appreciated there may be more second planetary gears than second planetary gears 722a and 722b shown in FIG. 7A. Therein, it is to be appreciated that there may be more planetary bearings than planetary bearings 723a and 723b. For the present disclosure, there may be four second planetary gears similar to second planetary gears 722a and 722b and four second planetary bearings similar to planetary bearings 723a and 723b housed in the second planetary carrier assembly 724. However, it is to be appreciated there may be less or more second planetary gears and second planetary bearings in the second planetary carrier assembly 724.

FIG. 7A also shows the hub stud assembly 514 may enclose the spindle 606. The spindle 606 may act as a supporting member of the hub stud assembly 514. FIG. 7A shows the second ring gear 726 is supported by the ring gear hub 728. The ring gear hub 728 may be mounted on the spindle 606 with help of splines. Axial movement of second ring gear 726 along the x-axis is locked by snap ring 730. Spindle 606, ring gear hub 728 and second ring gear 726 are stationary while second planetary gear box 512 may rotate about the axis of rotation 520. Additionally, there may be a clearance 731 between the second planetary gear box 512 and the second ring gear 726. Clearance 731 may circumferentially surround the second ring gear 726 and be enclosed by the housing of the second planetary gear box 512. The clearance 731 may allow the housing of the second planetary gear box 512 and the hub stud assembly 514 to freely rotate about the ring gear 726 and axis of rotation 520.

FIG. 7A shows a first tapper roller bearing 732 encircles the exterior of the spindle 606. FIG. 7A also shows a second tapper roller bearing 734 encircles the exterior of the ring gear hub 728. The first tapper roller bearing 732 and second tapper roller bearing 734 support and allow the hub stud assembly 514 to rotate freely with the second planetary gear box 512.

FIG. 7A also shows the external teeth of sun shaft pinion 615 of the sun shaft 614 may interlock with the second planetary gears 722a, 722b of the second planetary gear box 512. The interlocking of the teeth of the sun shaft pinion 615, may mechanically couple the sun shaft 614 to the second planetary gears 722a, 722b housed within the second planetary carrier assembly 724. The couplings between the sun shaft 614 and through output sleeve 716, the through output sleeve 716 and first planetary carrier assembly 714, sun gear shaft 710, and motor drive shaft 620 allows the mechanical energy from the electric motor 144 to affect the first planetary gears 712a, 712b and the second planetary gears 722a, 722b.

FIG. 7A shows the spring actuated hydraulic release brake assembly 510 may be mounted on vehicle frame 402 using frame fasteners 412. In particular, the brake assembly 510 may be directly mounted on the vehicle frame 402. FIG. 7A shows the spring actuated hydraulic release brake assembly comprises driveline flange 410. FIG. 7A also shows the vehicle frame 402 comprises frame flange 414, which may be the same or similar as the first and second frame flanges 414a, 414b shown in FIG. 4A and FIG. 4B. The driveline flange 410 may couple the spring actuated hydraulic release brake assembly 510 to the frame flange 414 and vehicle frame 402. The driveline flange 410 may also couple the wheel end driveline motor assembly 700 to the frame flange 414 and the vehicle frame 402. Frame fasteners 412 may be used to secure and couple the driveline flange 410 to the frame flange 414.

FIG. 7A shows brake housing 702 may also house components of the spring actuated hydraulic release brake assembly 510 that comprise a brake, such as springs 746, pistons 740, brake plates 744, and pressure plates 742.

The increased support provided by the brake housing 702 allows for less fasteners to be used for assembly. Decreasing the fasteners used to assemble the wheel end driveline motor assembly 700 may allow for service and maintenance activities to be performed in a decreased amount of time. Additionally, the greater support provided by the brake housing 702 may allow for service and maintenance activities to be performed without fully disassembling the wheel end driveline motor assembly 700. The reduction in disassembly time and the number components to be disassembled may increase the ease at which service and maintenance activities may be performed on the wheel end driveline motor assembly 700.

When the electric motor 144 is on, the electric motor 144 is configured to rotate motor drive shaft 620 about the axis of rotation 520. The sun gear shaft 710 may be coupled to and rotates with the motor drive shaft 620 about the axis of rotation 520. The teeth of the sun gear shaft 710 and the teeth of the first planetary gears 712a, 712b of the first planetary gear box 602 may be complementary and mesh. As the electric motor 144 generates a torque in and spins the motor drive shaft 620, the motor drive shaft 620 may transfer mechanical energy in the form of torque through sun gear shaft 710 to first planetary gears 712a, 712b. Therein, the sun gear shaft 710 may cause the first planetary gears 712a, 712b to rotate about the axis of rotation 520 and/or spin about the planetary bearings 713a, 713b, respectively.

Expanding out from the axis of rotation, the teeth of the first planetary gears 712a, 712b may complement, be interlocked, and meshed with the teeth of the first ring gear 718 of the planetary carrier assembly 714. When torque is applied, the first planetary gears 712a, 712b may cause the planetary carrier assembly 714 to rotate about the axis of rotation 520. The first planetary gears 712a, 712b and first ring gear 718 of the first planetary gear box 602 may slow the rotation of the planetary carrier assembly 714 relative to the sun gear shaft 710 and motor drive shaft 620. Therein, the first planetary gear box 602 may increase the torque generated by the electric motor 144 and by extension the sun gear shaft 710 transferred to the planetary carrier assembly 714.

The first planetary carrier assembly 714 may also be coupled to the sun shaft 614 via the through output sleeve 716. Therein, the rotation of the first planetary gear box 602 may transfer power to sun shaft 614 through the through output sleeve 716. Additionally, the through output sleeve 716 and sun shaft 614 may begin to rotate about the axis of rotation 520. The sun gear shaft 710 and the motor drive shaft 620 also rotate about the axis of rotation 520 but rotation speed different than the through output sleeve 716 and sun shaft 614. Wherein, the rotation of the sun shaft 614 and the through output sleeve 716 may be slower with a higher torque compared to the sun gear shaft 710 and motor drive shaft 620.

Continuing along the axis of rotation 520 in the wheel side 506 direction, the sun shaft pinion 615 of the sun shaft 614 may transfer mechanical energy through torque to the second planetary carrier assembly 724 though second planetary gears 722a, 722b and into the second planetary gear box 512. The teeth of the sun shaft pinion 615 may complement, be interlocked and mesh with the teeth of the second planetary gears 722a, 722b. Therein, the torque from the sun shaft pinion 615 may transfer mechanical energy to force the second planetary gears 722a, 722b to rotate about the axis of rotation 520 and/or spin about the planetary bearings 723a, 723b, respectively.

The teeth of the second planetary gears 722a, 722b may complement, interlock and mesh with the teeth of the second ring gear 726. Therein the second planetary gears 722a 722b may force the second planetary carrier assembly 724, and by extension the second planetary carrier (e.g., the second planetary gear box 512), to rotate with the second planetary gears 722a, 722b about the axis of rotation 520. The second planetary gears 722a, 722b and planetary gear box 512 may slow the rotation of the second planetary carrier assembly 724 compared to the rotation of the sun shaft 614. Therein, the second planetary gear box 512 may further increase the torque transferred by the sun shaft 614, generated by the electric motor 144 and increased by first planetary gear box 602.

The second planetary carrier assembly 724 and hub stud assembly 514 may be coupled with second planetary reduction fasteners 630 shown in FIG. 6. Therein the second planetary carrier assembly 724 may transfer mechanical energy to force hub stud assembly 514 to rotate. The hub stud assembly 514 may rotate with the second planetary carrier assembly 724 about the axis of rotation 520.

If a wheel may be coupled or fastened to a hub stud assembly 514 and may rest upon a surface with a friction. If the force created by torque of the electric motor 144, the first planetary gear box 602, and second planetary gear box 512 transferred to the hub stud assembly 514 is great enough to overcome friction of a surface, a wheel coupled to and the hub stud assembly 514 may be forced to rotate about the axis of rotation 520 in the direction of the applied torque of the electric motor 144. For this example, when a pair of wheel end driveline motor assemblies 700 that are mirrored are attached to the vehicle frame 402 and operated as described, the rotation of a pair of wheels attached to hub stud assemblies 514 may propel a vehicle forward or backward.

In some examples, such as during a turn, a pair of wheel end driveline motor assemblies 500 may drive a plurality of hub stud assemblies 514 with different torques, therein rotating the wheels at different speeds.

Braking mechanisms 738 are incorporated into the spring actuated hydraulic release brake assembly 510 of the wheel end driveline motor assembly 500. The braking mechanisms 738 may be a dynamic brake integrated into the wheel end driveline motor assembly 500. Therein, the braking mechanism 738 may be an integrated spring actuated hydraulic release brake. Components of the braking mechanism 738 include the pistons 740, the pressure plate 742, the brake plate 744, and the springs 746, for example. Along the x-axis, the pistons 740 and brake plate 744 are closest to the wheel side 506, while the springs 746 are closest to the frame side 508. The pressure plate 742 is spaced between the springs 746 and the piston 740, as well as the springs 746 and brake plate 744 with respect to the x-axis. The brake plate 744 is located below the pistons 740 with respect to the z-axis.

In a first example where braking is not applied, the spring actuated hydraulic release brake assembly 510 remains in a release condition. Therein, actuating fluid fills the volume of and is at a great enough pressure for the pistons 740 to remain extended toward the frame side 508 along the x-axis. For this example, pistons 740 are extended and apply against a pressure plate 742 in the direction of the frame side 508. The force applied to the pressure plate from the pressure of the actuating fluid and pistons 740 may prevent the pressure plate 742 from touching and applying pressure to the brake plate 744 in the direction of the wheel side 506. For this example, the pressure plate 742 may press against the springs 746 in the toward the frame side 508. The force of the piston 740 transferred into the pressure plate 742 is greater than the spring force of the springs 746. Therein the springs 746 remain compressed. As such, the spring force of the springs 746 is not transferred into the brake plate 744 from the pressure plate 742. Therein, the brake plates 744 may not apply force and place resistance on a hub stud assembly 514 and wheel when rotating.

For another example, the spring actuated hydraulic release brake assembly 510 shifts to a braking condition. When a brake condition is applied from a braking device (e.g., braking input device 33 of FIG. 3) an actuating fluid (e.g., such as oil), may be gradually removed from the piston, wherein the actuating fluid may be reduced partially or to a minimum quantity. Therein, when evacuating the actuating fluid, the pressure of actuating fluid may gradually decrease until the force from the pressure of the pistons 740 is less than the spring force from the springs 746. Therein, a net force, e.g., the difference between the force of the pistons 740 and spring force of the springs 746, may be greater in the direction of the spring force of the springs. Therein, a net force may press on the pressure plate 742 in the direction of the wheel side 506. The spring force of the springs 746 may be transferred in the direction of the wheel side 506 through the pressure plate 742. The greater spring force and net force therein causes the pistons 740 to contract in the direction of the wheel side 506. For this example, the springs 746 will expand and push the on a pressure plate 742 in the direction of the wheel side 506. The higher a demand for breaking is signalled from braking device, the more fluid will be removed from the pistons 740, therein increasing the rate of contraction and decreasing the force applied by the pistons 740. Therein, the rate of expansion of springs 746 and net force applied in the wheel side may be increased. As the springs 746 expand and the pistons 740 contract toward the wheel side, the pressure plate 742 may press against the brake plates 744. For this example, the force from the pressure plate 742 may press the brake plate 744 along the x-axis toward the wheel side 506 and against the hub stud assembly 514. When pressed against hub stud assembly 514, the brake plate 744 applies force in the form of friction to slow and/or stop the rotation of a hub stud assembly 514 and wheel.

For the previous example, brake assembly 510 and braking mechanisms 738 may act as service brake. A service brake may be a brake used while a vehicle is operating that brings the vehicle to a smooth stop. The force of applied by the braking mechanisms 738 may be adjusted by a brake input device. For the previous example, the brake input device adjusted the pressure of actuating fluid in the pistons 740.

For another example, the electric motor 144 is turned off. For this example, the brake assembly 510 shifts to a locking position. When the brake assembly 510 is locked, the actuating fluid (e.g., such as oil) may be rapidly removed from the piston to a minimum quantity. Therein, after evacuating the actuating fluid, the internal pressure of the pistons 740 is reduced to a minimum, such as to zero gage, one atmosphere, or less when the motor 144 is not operating. For this example, the force applied by the pistons 740 may decrease to near zero, while a net force in the direction of the wheel side 506 may substantially comprise the spring force of the springs 746. Therein, the pistons 740 will contract to a minimum while the springs 746 will be extended to a maximum and press on the pressure plate 742 in a short period of time. For this example, the pressure plate 742 will press on and apply force substantially similar to the maximum spring force of the springs 746 to the brake plates 744. The brake plates 744 are thus engaged and prevent a hub stud assembly 514 and wheels from rotating. The brake assembly 510 are locked when motor 144 is switched off.

For the previous example, brake assembly 510 and braking mechanisms 738 may act as a parking brake. A parking brake applies a maximum braking force while a vehicle is not operating that ensures a vehicle does not move when the engine is unpowered or transmission is set to park. For the previous example, the brake assembly 510 may act also act as an emergency brake. When engaged, an emergency brake may apply a maximum braking force to bring a vehicle to a complete stop in a short period of time and prevent a vehicle from entering a state of motion.

The previous examples illustrate how the spring actuated hydraulic release brake assembly 510 may serve the purpose of both a service brake and a parking brake. The wheel end driveline motor assembly 700 may thus not have a separate parking brake. Simplifying and reducing the number of components of the wheel end driveline motor assembly 700 may reduce the monetary price of manufacture and maintenance.

Further, the wheel end driveline motor assembly 700 enables planetary ratios to be modular and changeable in the first planetary gear box 602. In particular, the wheel end driveline motor assembly 700 may provide four different ranges of total ratios by selecting different intermediate planetary ratios. Different intermediate planetary ratios can be changed by changing the planet gear and sun gear while keeping all parts of reduction the same.

Instructions for carrying out method 800 and the rest of the methods included herein may be executed by a controller based on instructions stored on a memory of the controller and in conjunction with signals received from sensors of the engine system. The sensors may be the same or similar to the sensors 30 described with reference to FIG. 3. The controller may employ motor actuators of the motor system to adjust motor operation, according to the methods described below. In one or more examples, the controller may be the same or similar to controller 32. Additionally, the actuators may be the same or similar to the actuators 34.

Figure 7B:
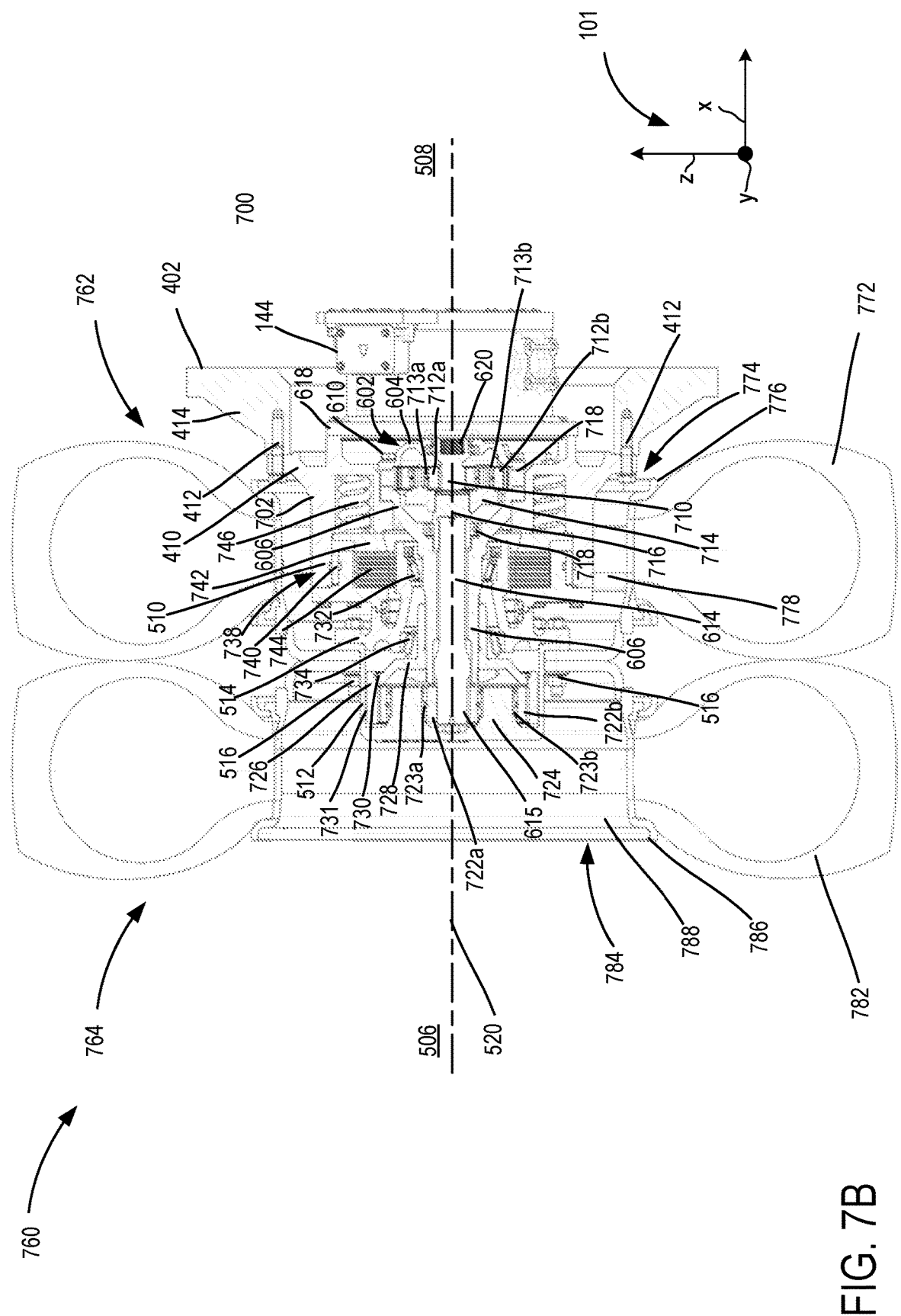
FIG. 7B is a cutaway view of the wheel end driveline motor assembly, wherein wheels are fastened, according to one or more examples of the present disclosure.

Looking now to FIG. 7B, FIG. 7B shows an example of a cross-section of a wheel end driveline motor assembly 760 in an assembled state, wherein wheels are coupled to components of the driveline. The wheel end driveline motor assembly 760 may be the same or similar to wheel end driveline motor assembly 700. The cross-section taken on the wheel end driveline motor assembly 760 may be on the axis of rotation 520 and coplanar with a plane formed by the z and x axes.

The wheel end driveline motor assembly 760 comprises a first wheel 762 and a second wheel 764. Wherein when fastened to the driveline motor assembly 760, the first wheel 762 may be located closer to the frame side 508 and the second wheel 764 may be located closer to the wheel side 506. However, it is to be appreciated that the embodiment of driveline motor assembly 760 may be non-limiting. Other embodiments have been contemplated and considered. For one alternative example, there may be an embodiment where a single wheel is attached to the wheel end driveline motor assembly 760 instead of a plurality of two wheels.

The first wheel 762 may same as or similar to the first side inner wheel 152*a* and/or the second side inner wheel 152*b* of FIG. 3. The first wheel 762 may circumferentially surround the spring actuated hydraulic release brake assembly 510 and a portion of the hub stud assembly 514. The first wheel 762 may be formed of a tire 772 and a rim 774. The tire 772 may couple and circumferentially surround the barrel 778 of the rim 774 and be supported by the rim 774. A rim lip 776 may couple and prevent the removal of the tire 772 from the rim 774 without using deliberate force and deflating the tire 772. The rim 774 may circumferentially surround the spring actuated hydraulic release assembly 510 and a portion of the hub stud assembly 514. The rim 774 may be coupled to frame side 508 of the hub stud assembly via fasteners 516. The rim 774 may rotate about the axis of rotation 520, the hydraulic release brake assembly 510, and a portion of the hub stud assembly 514.

The second wheel 764 may same as or similar to the first side outer wheel 154*a* and/or the second side outer wheel 154*b* of FIG. 3. The second wheel 764 may circumferentially surround the second planetary gear box 512 and a portion of the hub stud assembly 514. The second wheel 764 may be formed of a tire 782 and a rim 784. The tire 782 may couple and circumferentially surround the barrel 788 of the rim 784 and be supported by the rim 784. A rim lip 786 may couple and prevent the removal of the tire 782 from the rim 784 without using deliberate force and deflating the tire 782. The rim 784 may circumferentially surround the second planetary gear box 512 and a portion of the hub stud assembly 514. The rim 784 may be coupled to wheel side 506 of the hub stud assembly via fasteners 516. The rim 784 may rotate about the axis of rotation 520, the second planetary gear box 512, and a portion of the hub stud assembly 514.

First wheel 762 and second wheel 764 may be fastened to a hub stud assembly 514 as in driveline motor assembly 760 and may rest upon a surface coplanar with a plane formed by the x-y axis. Wherein, the surface and the tires 772, 782 have a friction. For this example, there may be a pair of wheel end driveline motor assemblies similar to driveline motor assembly 760 that are coaxial and attached to the vehicle frame 402. For this example, the pair of wheel end driveline motor assemblies may be operating at the same conditions and receiving the same torque. For this example, a force is created by torque of the electric motor 144, the first planetary gear box 602, and second planetary gear box 512. Wherein, the force is transferred to the hub stud assembly 514 and is great enough to overcome the force of friction between the surface and the tires 772, 782 and of the weight of the off-highway vehicle 400. Therein, the first and second wheels 762, 764 may be forced to rotate about the axis of rotation 520 in the direction of the applied torque of the electric motor 144. For this example, the torque may be in a forward direction, therein the first and second wheels 762, 764 may propel the off-highway vehicle 400 toward the front side 112. For another example, the torque may be in a reverse direction, therein the first and second wheels 762, 764 may propel the off-highway vehicle 400 toward the rear side 114.

Figure 8:
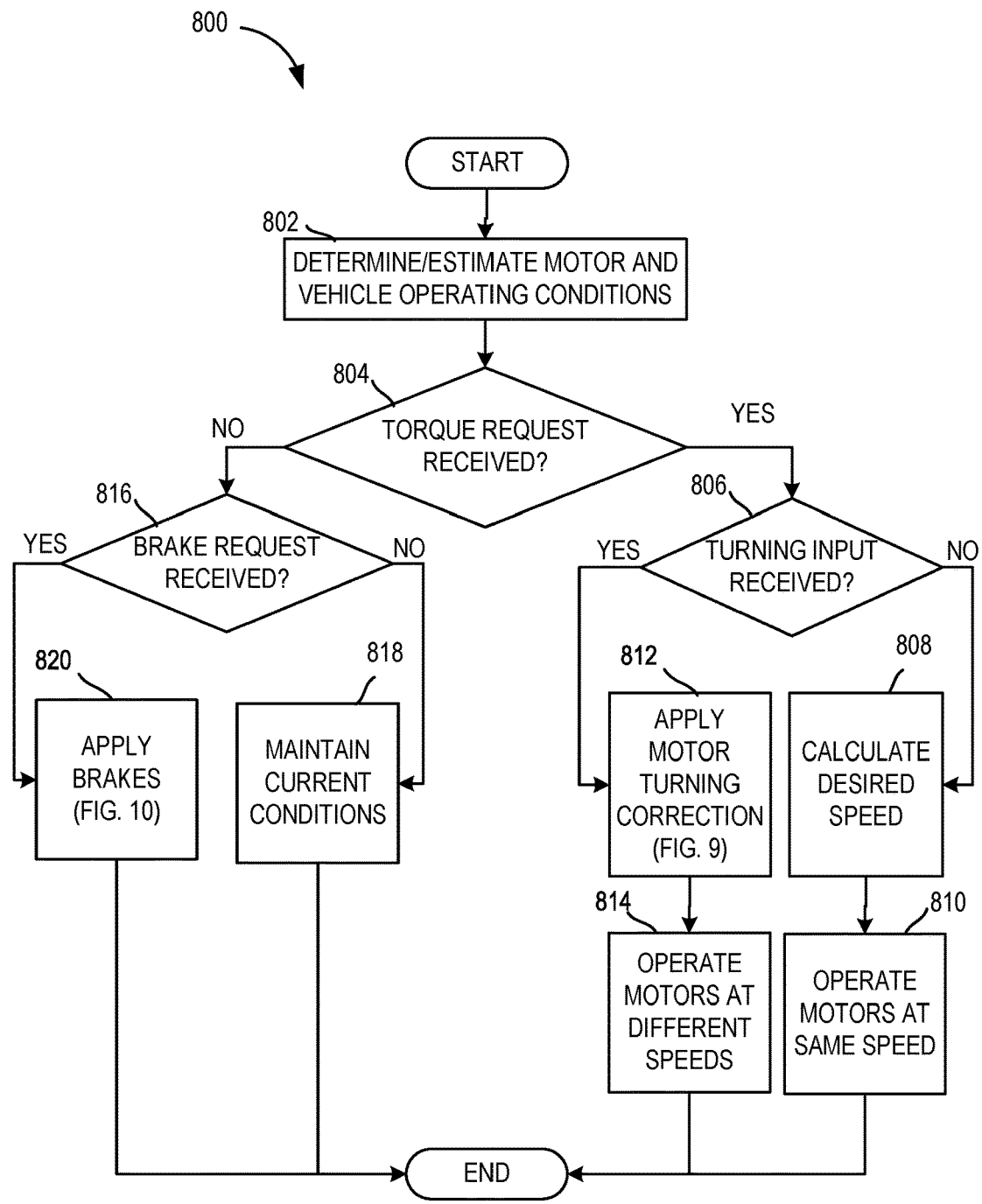
FIG. 8 shows a flow chart of an example method for operating a vehicle comprising the wheel end driveline configuration, according to one or more examples of the present disclosure.

FIG. 8 shows a method 800 for operating a vehicle comprising a wheel end driveline motor assembly that comprises two wheel end driveline electric motors. The two wheel end driveline electric motors may also be referred to herein as a first side electric motor and a second side electric motor herein. In one or more examples, the vehicle operated in method 800 may be the same or similar to electric vehicle 140.

Step 802 of method 800 includes estimating and/or determining engine and vehicle operating conditions. Engine and vehicle operating conditions may include estimating one or more of motor speeds, estimating the torque of each of the wheel end drivelines, the load of the motors, vehicle speed, a torque demand, a current and voltage provided by and charge of battery, and duration (or distance) elapsed since last motor start, for example.

There may be a plurality of sensors used in step 802 and in other steps of method 800. One example of a sensor, may include a torque input sensor that detects the input of an operator input device, such as the depression of an accelerator pedal. Another example sensor, may include a turning input sensor to detect an input to a turning input device, such as input to a steering wheel. A brake sensor may further be included that detects the input of a brake input device, such as the depression of a brake pedal.

Other examples of sensors may include RPM sensors used to detect the RPM that may be used to estimate output speed of each electric motor 144 of the first and second side wheel end drivelines 408a, 408b, respectively, as well as a voltmeter to detect the voltage and/or ammeter used to detect current along the first and second side connections 158a, 158b, respectively. For example, there may be a plurality of voltmeters to detect voltage in the direct current before and alternating current after the first and second side inverters 404a, 404b, respectively. There may also be sensors to determine a position of the front wheels, as well as a sensor for determining the steering angle of the turning input device.

Following step 802, method 800 includes determining whether a torque request has been received at step 804. For example, the torque request may be received via an operator input device (e.g., operator input device 29), such as an accelerator pedal of the vehicle. The torque request may include a request to accelerate or a request to decelerate the vehicle. As an example, the torque request received at step 804 may be a request to accelerate the vehicle indicated via a tip-in event at the operator input device. Alternatively, the torque request at step 804 may be a request to decelerate the vehicle indicated via a tip-out event at the operator input device. In the case of the tip-out event, it is noted that the operator input device may transition from a first depressed position to a second depressed position. That is, the operator input device may be at least partially depressed in the case of a tip-out event. Alternatively, the operator input device may be released at step 802. For purposes of method 800, it is noted that if the torque request received at step 804 (804 is "YES"), then the vehicle is in an on condition and no brake request is present at step 804.

If a torque request has been received (e.g., 804 is "YES"), method 800 proceeds to step 806. The torque request at step 804 includes an indication of whether to move the vehicle forwards (in a direction towards a front of the vehicle) or backwards (in a direction towards a rear of the vehicle).

At step 806 the method 800 includes determining whether a turning input has been received. In one or more examples, the turning input may be determined based on input received at a steering input device (e.g., turning input device 31) such as a steering wheel. A turning input may be determined to be received responsive to one or more sensors of the vehicle detecting a turning angle greater than a threshold. For example, the turning angle may be determined as being greater than the threshold responsive to detecting that an angle of the wheels of the vehicle (e.g., the front wheels) relative to a longitudinal centerline of the vehicle are not substantially parallel (e.g., parallel within 2%).

If "NO", method 800 proceeds to 808. That is, if there is no turning input received and the vehicle is being commanded to be driven straight, method 800 proceeds to 808.

At step 808, method 800 includes calculating a speed or RPM at which to operate the two wheel end driveline electric motors (e.g., first and second side electric motors 144a, 144b) based on the torque request received at step 804. The two wheel end driveline electric motors may also be referred to herein as a first side electric motor and a second side electric motor herein.

Following step 808, at step 810 method 800 includes controlling the first side electric motor and the second side electric motor to both be operated at the same speed. In particular, the first side electric motor and the second side electric motor are both controlled to be operated based on the speed or RPM calculated at step 808. The first side electric motor and second side electric motor may accelerate the off-highway vehicle 140 in a forward direction towards a front side of the vehicle. However, in other examples, the vehicle may be accelerated in a reverse direction towards a rear side of the vehicle (e.g., rear side 114). In some examples, the RPMs of the first side electric motor and second side electric motor are increased at the same rate. Following step 810, method 800 ends.

Returning to 806, if a turn input is received (806 is "YES"), method 800 proceeds to step 812. That is, if the turning angle is determined to be greater than the threshold at step 806, then method 800 proceeds to step 812. At step 812, method 800 proceeds to a method sub-routine at FIG. 9 to apply a motor turning correction. After completing the subroutine at step 812, method 800 may proceed to 814. At step 814 method 800 includes controlling the first side electric motor and the second side electric motor to both be operated at different speeds so the vehicle may turn without slipping or losing traction.

As the vehicle turns, a distance traveled by the wheel(s) of the first side (e.g. first side 116) differs from a distance traveled by the wheel(s) of the second side (e.g., second side 118). In particular, a side of the vehicle that is at an inside of the turn has a reduced distance to travel compared to the side of the vehicle that is at an outside of the turn. Thus, if the motors are operated at the same speed during a turn, issues of slip may result. To avoid such slip, a motor turning correction may be used to operate the first side electric motor and the second side electric motor at different speeds or RPMs, as detailed in FIG. 9.

Figure 9:
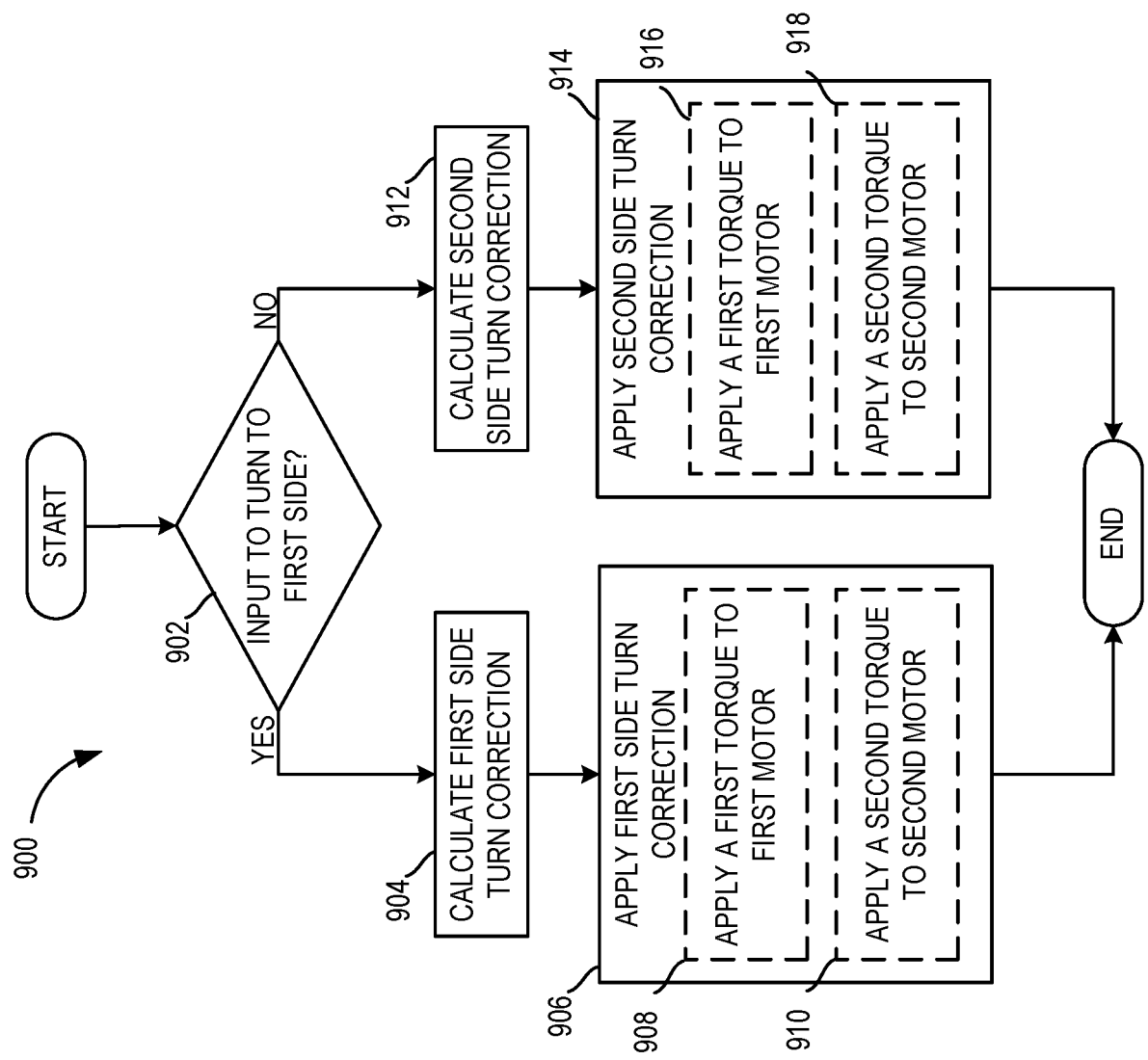
FIG. 9 shows a flow chart of a second method for operating the vehicle comprising the wheel end driveline configuration, according to one or more examples of the present disclosure.

Thus, turning briefly to FIG. 9, method 900 (a sub-routine of method 800) is shown. At step 902, the method 900 includes determining whether the vehicle has received an input to turn to the first side (e.g. first side 116). The input to turn to the first side is determined based on the turn angle calculated at step 806, for example. If the turn angle is between the centerline of the vehicle (e.g., centerline 119) and a first side of the vehicle (e.g., first side 116), method 900 determines that an input to turn to the first side has been received at step 902 ("YES"). If it is determined that an input has been received to turn to the first side at step 902 (902 is "YES"), then method 900 continues to step 904.

At step 904, a first side turn correction is calculated. The first side turn correction includes calculating a first speed or RPM at which to operate the first side electric motor (e.g., first side electric motor 144*a*) and a second speed or RPM at which to operate the second side electric motor (e.g., second side electric motor 144*b*) that is different than the first speed. The first side turn correction specifically calculates the first speed and the second speed to operate the vehicle at a desired speed based on the torque request received at step 804 while also carrying out the turn request to the first side without slip. It is noted that the vehicle may be moved forwards (in a direction towards a front of the vehicle) or backwards (in a direction towards a rear of the vehicle), based on the torque request received at step 804.

The first side turn correction is based on the size of the angle of turn. The larger the turn angle (e.g., the more the vehicle wheels are turned away from the vehicle centerline towards the first side), the sharper the turn request is to the first side. The smaller the turn angle (e.g., the less the vehicle wheels are turned away from the vehicle centerline towards the first side), the wider the turn request is to the first side.

If a request for a turn is sharper, a difference in operational speed between the first side electric motor and second side electric motor will be greater compared to a request for a wider turn.

After 904, the method 900 continues to step 906. At step 906 the first side turn request is applied to the first side electric motor at sub-step 908 and the second side electric motor at sub-step 910. In particular, at sub-step 908 a first torque is applied via the first side electric motor to operate the first side electric motor at a first speed or RPM and turn one or more associated wheels at the first speed. At sub-step 910 a second torque is applied via the second side electric motor to operate the second side electric motor at a second speed or RPM and turn one or more associated wheels at the second speed. Because the turn is towards the first side, the first torque applied via the first side electric motor is smaller than the second torque applied via the second side electric motor at step 906. Thus, when turning towards the first side, the first side electric motor is operated at a lower speed or RPM compared to the second side electric motor. By operating the first side electric motor that is at an inside of the turn towards the first side at a lower speed or RPM compared to the second side electric motor, unwanted slip is avoided. Following step 906, method 900 proceeds to end.

Returning to 902, if the input to turn is not an input to turn to the first side (e.g., 902 is "NO"), method 900 continues to step 912. At step 912, a second side turn correction is calculated. The second side turn correction calculates a torque request to apply to the first side electric motor for the second side turn and a torque request for the second side electric motor. The second side turn torque request calculated for the first side electric motor is different than the torque request calculated for the second side electric motor.

The second side turn correction is based on the size of the angle of turn. The larger the turn angle (e.g., the more the vehicle wheels are turned away from the vehicle centerline towards the second side), the sharper the turn request is to the second side. The smaller the turn angle (e.g., the less the vehicle wheels are turned away from the vehicle centerline towards the second side), the wider the turn request is to the second side.

After 912, the method 900 continues to step 914. At step 914 the second side turn request is applied to the first side electric motor at sub-step 916 and the second side electric motor at sub-step 918. In particular, at sub-step 916 a first torque is applied via the first side electric motor to operate the first side electric motor at a first speed or RPM at turn one or more associated wheels at the first speed. At sub-step 918 a second torque is applied via the second side electric motor to operate the second side electric motor at a second speed or RPM and turn one or more associated wheels at the second speed. Because the turn is towards the second side, the second torque applied via the second side electric motor is smaller than the first torque applied via the first side electric motor at step 914. Thus, when turning towards the second side, the second side electric motor is operated at a lower speed or RPM compared to the first side electric motor. In this way, the second side electric motor that is at an inside of the turn towards the second side is operated at a lower speed or RPM compared to the first side electric motor. Following step 914, method 900 proceeds to end.

After method 900 ending, where method 900 is a sub-routine executed at step 812 of method 800, method 800 proceeds from step 812 to step 814. At step 814, the motors are operated at different speeds based on the turn correction in step 812. After step 814 method 800 proceeds to end.

Returning to step 804, if it is determined that a torque request is not received (804 is "NO") method 800 proceeds to step 816 to determine whether or not a brake request has been received. In one or more examples, a brake request may be received via a signal output responsive to a brake input device being engaged, such as a brake pedal being depressed. In other examples, a brake request may be generated responsive to the vehicle being turned off.

If it is determined that a brake request is not received at step 816 (816 is "NO"), method 800 proceeds to step 818. Step 818 includes maintaining current operating conditions of the vehicle. For example, maintaining the current operating conditions at step 818 may include maintaining the operating conditions estimated from step 802, such as the speed or RPM of the first side electric motor and the speed or RPM of the second side electric motor. Following step 818, method 800 ends.

Figure 10:
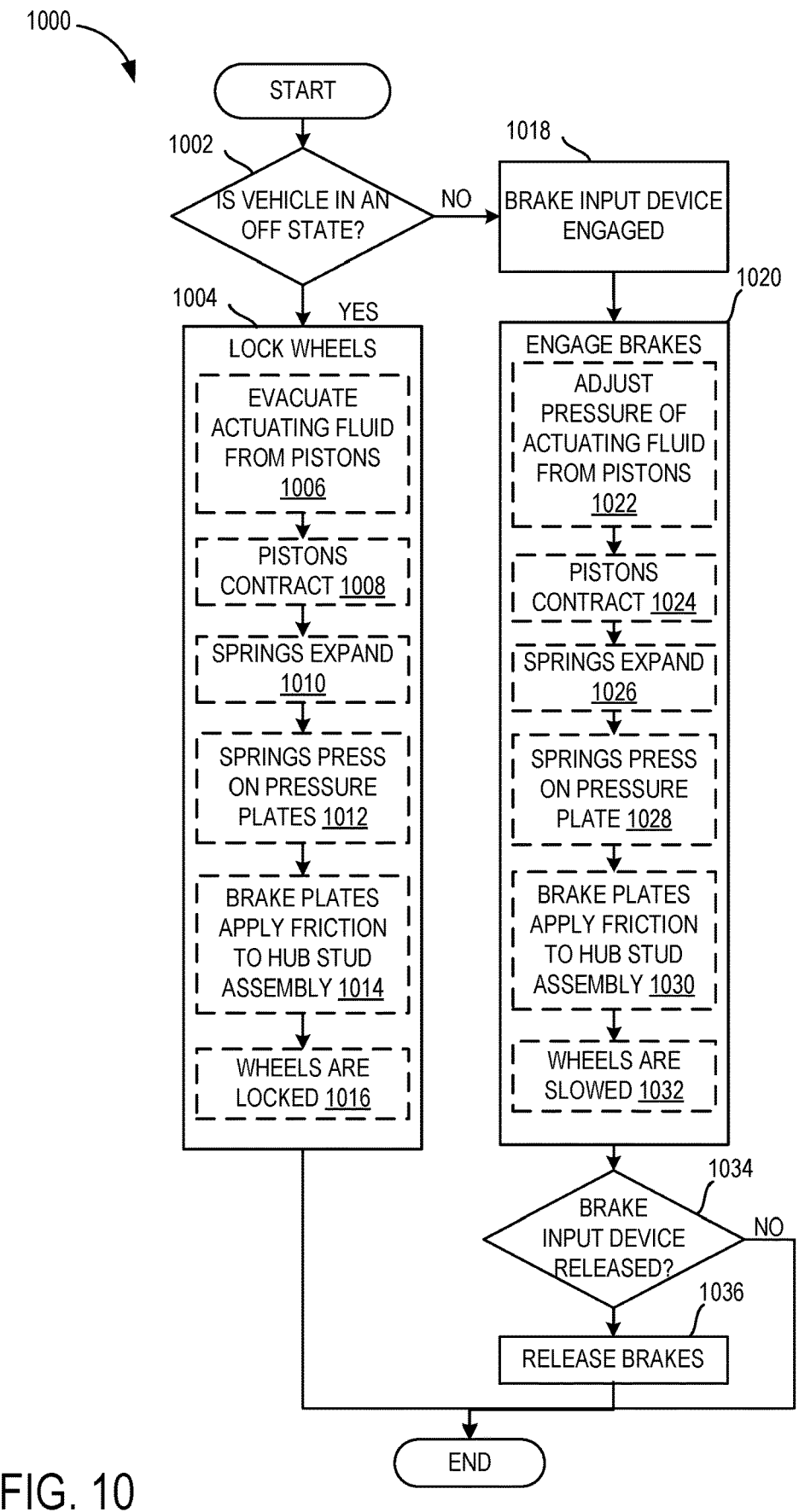
FIG. 10 shows a flow chart of a third method for operating the vehicle comprising the wheel end driveline configuration, according to one or more examples of the present disclosure.

If it is determined that a brake request is received at step 816 (816 is "YES"), method 800 continues to step 820. At step 820, method 800 carries out a braking process via method 1000 shown at FIG. 10. Thus, turning briefly to FIG. 10, FIG. 10 shows a block flow diagram of method 1000 for controlling the braking mechanisms of the vehicle.

The block flow diagram of a method 1000 begins at 1002. At 1002 the method includes determining whether the vehicle is in an on state or an off state. It is noted that the vehicle may be determined as in the on state or the off state based on whether the first side electric motor and the second side electric motor of the wheel end driveline are on or off. It is noted that the on state refers to an operational state where the first side electric motor and the second side electric motor are both powered. The off state refers to a state in which both the first side electric motor and the second side electric motor are un-powered. If the first side electric motor and the second side electric motor are determined to be off (1002 is "YES"), then method 1000 continue to 1004.

At 1004 a dynamic brakes of the brake assembly 510 locks the wheels. In particular, the dynamic brakes lock the hub stud assembly (e.g., hub stud assembly 514) to prevent the wheels coupled to the first side electric motor and the second side electric motor of the wheel end driveline from rotating via the hub stud assembly.

Step 1004 comprises a plurality of sub-steps to lock the wheels. In particular, at sub-step 1006 actuating fluid, such as oil, is evacuated from the pistons (e.g., pistons 740) of the brakes, thus reducing the actuating fluid pressure to less than a threshold pressure.

Following sub-step 1006, method 1000 proceeds to sub-step 1008 where the pistons contract due to the low actuating fluid pressure. That is, responsive to the actuating fluid pressure being reduced to less than the threshold pressure at sub-step 1006, the pistons contract at sub-step 1008.

Responsive to the pistons contracting at step 1008, the method 1000 proceeds to sub-step 1010. At sub-step 1010 the springs (e.g., springs 746) of the braking assembly expand due to the force from the pistons being reduced. The springs then apply a force to pressure plates (e.g., pressure plates 742) of the brake assembly at sub-step 1012. The springs pressing on the pressure plates causes the pressure plates to apply a force to brake plates (e.g., brake plates 744) of the braking assembly. The brake plates then press against the hub stud assembly at sub-step 1014. If the wheels of the vehicle were rotating at sub-step 1014, the brake plates pressing against the hub stud assembly reduces an RPM of the wheels at sub-step 1014 to zero RPM.

Following sub-step 1014, method 1000 includes locking the wheels at sub-step 1016. In the locked state at sub-step 1016, the brake plates apply greater than a threshold force to the hub stud assemblies to prevent external forces such as gravity from moving the vehicle. In the locked state, the hub stud assemblies and corresponding wheels of the vehicle are locked by the friction of the brake plates applied to the hub stud assemblies after the wheels of the vehicle are at zero RPM.

After sub-step 1016, step 1004 is exited. Method 1000 then proceeds to end. Following step 1004, it is noted that the wheels are in the locked state, as the brake plates are engaged and the hub stud assemblies are locked to prevent corresponding wheels of the vehicle from rotating. After method 1000 ending, where method 1000 is a sub-routine executed at step 820 of method 800, method 800 proceeds from step 820 to end.

Turning back to 1002, if the first side electric motor and the second side electric motor of the vehicle are on (1002 is "NO") the method 1000 continues to 1018. Because a brake request has been received per step 816 and it has been confirmed at step 1002 that the brake request is not due to the vehicle being in the off state, it is determined that the brake request is due to a brake input device (e.g., braking input device 33) being engaged at step 1018. Following step 1018, method 1000 proceeds to step 1020.

At step 1020 the brake assemblies engage respective brake plates against the hub stud assemblies to slow and/or stop the wheels coupled to the first wheel end drive assembly and the second wheel end drive assembly. Step 1020 comprises a plurality of sub-steps to engage the brake plates. In particular, starting at sub-step 1022 of step 1020, actuating fluid such as oil is evacuated from the pistons of the brake assemblies. A quantity of actuating fluid evacuated from the pistons is dependent upon one or more of the pressure placed on the braking input device and a duration of time the braking input device, such as a brake pedal, is engaged. The greater the pressure and duration, the more actuating fluid is evacuated from the pistons which in turn reduces a pressure of the actuating fluid.

After sub-step 1022, the method continues to sub-step 1024. At sub-step 1024 the pistons contract due to the reduction of actuating fluid pressure. Depending on the force and duration of pressure placed on a brake input device, there may be a partial or full contraction of the pistons at sub-step 1024. In one or more examples, if a braking input device is depressed with a force greater than a threshold for more than a threshold duration of time, the quantity and pressure of actuating fluid may be reduced to zero gauge so that the pistons are fully contracted.

Following sub-step 1024, method 1000 proceeds to sub-step 1026 where the springs expand due to the lack of force being applied from the pistons to the springs. Depending on the force and duration of a pressure placed on the brake input device, there may be a partial expansion or full expansion of the springs.

As the springs expand, the springs press on the pressure plates at sub-step 1028, and in turn, the pressure plates press on and apply force to the brake plates at sub-step 1030. The brake plates then press against the hub stud assemblies to slow the rotation of the hub stud assemblies and corresponding wheels of the vehicle at sub-step 1030. Increasing the force on the brake pedal increases the force applied from the brake plates to the hub stud assemblies.

If the brake input device is engaged with enough force long for a long enough duration, the brake plates may reduce the speed of the hub stud assemblies and corresponding wheels to zero RPM. At zero RPM the hub stud assemblies and wheels may be prevented from rotating. In other examples, however, the slowing the wheels at sub-step 1032 may be reducing the speed of the wheels to a non-zero RPM that is less than a speed of the wheels when the brake input device is determined to be engaged.

After 1032, the method 1000 proceeds to step 1034 to determine whether the brake input device has been released. For example, the brake input device may be determined as released responsive to a brake pedal of the vehicle being released so that it is no longer in a depressed state. If it is determined that the brake input device has not been released at step 1034 (step 1034 is "NO"), method 1000 may exit. It is noted that after method 1000 ending, method 800 also proceeds from step 820 to end.

If it is determined that the brake input device has been released at step 1034 (step 1034 is "YES"), method 1000 includes releasing the brakes at step 1036. Releasing the brakes at step 1036 includes flowing the actuating fluid, such as oil, to increase an actuating fluid pressure to be greater than a threshold. The pressure of the actuating fluid applies force to the pistons, causing the pistons to extend and apply a force to the pressure plates. The pressure plates transfer the force from the pistons and press on the springs, where the force of the pistons is greater than the force of the springs. In turn, the spring are compressed. As the springs compress, the pressure plates retract away from the brake plates. The brake plates then retract away from the hub stud assemblies such that the brake plates do not apply a resistive force to the hub stud assemblies.

Because the brake plates are no longer applying a resistive force to the hub stud assemblies, the hub stud assemblies and corresponding wheels are able to increase in rotational speed. Following step 1036, method 1000 may end. After method 1000 ending, where method 1000 is a sub-routine executed at step 820 of method 800, method 800 proceeds from step 820 to end.

The previous examples in method 1000 show how the spring actuated hydraulic release brake assemblies may serve the purpose of both service and parking brake. Because the brakes are locked responsive to a vehicle off condition, the wheel end drivelines do not require a separate parking brake, thus simplifying and reducing the number of components needed.

Thus, disclosed herein are systems and methods for a vehicle comprising a first wheel end driveline and a second wheel end driveline coupled to opposite sides of the vehicle, where the first and second wheel end drivelines, e.g. the first and second side wheel end drivelines, comprise a first side wheel end motor and a second side wheel end motor, respectively. In this way, the technical effect of improved operational efficiency and a more compact vehicle results.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An off-highway vehicle system, comprising:
an operator input device;
a first wheel coupled to a first side of an off-highway vehicle;
a second wheel coupled to a second side of the off-highway vehicle;
a first wheel end driveline positioned coaxially with respect to the first wheel, wherein the first wheel end driveline comprises a first side wheel end motor and a first brake housing, the first side wheel end motor coupled to the first brake housing;
a second wheel end driveline positioned coaxially with respect to the second wheel, wherein the second wheel end driveline comprises a second side wheel end motor and a second brake housing, the second side wheel end motor coupled to the second brake housing,
wherein the first side wheel end motor is directly coupled to the first brake housing, and wherein the first brake housing is directly coupled to a frame of the off-highway vehicle.

2. The off-highway vehicle system of claim 1, wherein the first wheel end driveline and the second wheel end driveline are coupled to a U-shaped frame of the off-highway vehicle.

3. The off-highway vehicle system of claim 1, further comprising:
a controller, the controller comprising instructions stored in non-transitory memory executable to:
receive a torque request via the operator input device, and
rotate the first wheel via the first side wheel end motor and rotate the second wheel via the second side wheel end motor, a speed of the first wheel and a speed of the second wheel based on the torque request,
wherein the first wheel is coupled to the first side wheel end motor via a first side wheel end driveline, and
wherein the second wheel is coupled to the second side wheel end motor via a second side wheel end driveline that is separate from the first side wheel end driveline.

4. The off-highway vehicle system of claim 3, further comprising:
a turning input device,
wherein the controller comprises further instructions stored in non-transitory memory executable to:
receive a turning input via the turning input device,
wherein the speed of the first wheel and the speed of the second wheel are further based on the turning input.

5. The off-highway vehicle system of claim 4, wherein the speed of the first wheel and the speed of the second wheel are different, and wherein the off-highway vehicle does not include a differential and does not include a drive shaft.

6. The off-highway vehicle system of claim 1, further comprising:
a first side brake positioned within the first brake housing;
a second side brake positioned within the second brake housing;
a first planetary reduction assembly positioned within the first brake housing, wherein the first planetary reduction assembly is positioned coaxially with respect to the first wheel; and
a second planetary reduction assembly positioned within the second brake housing, wherein the second planetary reduction assembly is positioned coaxially with respect to the second wheel.

7. The off-highway vehicle system of claim 6, wherein the first planetary reduction assembly and the second planetary reduction assembly each include first planetary reduction gears and second planetary reduction gears.

* * * * *